(12) United States Patent
Yao et al.

(10) Patent No.: US 12,082,063 B2
(45) Date of Patent: Sep. 3, 2024

(54) REFERENCE SIGNAL MEASUREMENT METHOD AND DEVICE

(71) Applicant: Huawei Technologies Co., Ltd., Shenzhen (CN)

(72) Inventors: Chuting Yao, Beijing (CN); Jian Wang, Beijing (CN); Haibo Xu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 427 days.

(21) Appl. No.: 17/598,098

(22) PCT Filed: Mar. 27, 2020

(86) PCT No.: PCT/CN2020/081719
§ 371 (c)(1),
(2) Date: Sep. 24, 2021

(87) PCT Pub. No.: WO2020/192763
PCT Pub. Date: Oct. 1, 2020

(65) Prior Publication Data
US 2022/0191754 A1    Jun. 16, 2022

(30) Foreign Application Priority Data

Mar. 27, 2019   (CN) .......................... 201910239930.5

(51) Int. Cl.
*H04W 36/00*  (2009.01)
*H04L 5/00*  (2006.01)
*H04W 36/08*  (2009.01)

(52) U.S. Cl.
CPC ..... *H04W 36/00837* (2018.08); *H04L 5/0051* (2013.01); *H04W 36/0058* (2018.08); *H04W 36/0061* (2013.01); *H04W 36/08* (2013.01)

(58) Field of Classification Search
CPC ....... H04W 36/00837; H04W 36/0058; H04W 36/0061; H04W 36/08; H04L 5/0051
See application file for complete search history.

(56) References Cited

U.S. PATENT DOCUMENTS

2018/0351611 A1   12/2018  Nagaraja et al.
2018/0368034 A1   12/2018  Lin et al.
(Continued)

FOREIGN PATENT DOCUMENTS

CN   101867989 A   10/2010
CN   109041098 A   12/2018
(Continued)

OTHER PUBLICATIONS

R1-1806091, vivo, "NR UE power saving," 3GPP TSG RAN WG1 Meeting #93, Busan, Korea, May 21-25, 2018, 5 pages.
(Continued)

*Primary Examiner* — Kent Krueger
(74) *Attorney, Agent, or Firm* — Conley Rose, P.C.

(57) ABSTRACT

A reference signal measurement method includes determining, by a terminal device, that the terminal device meets a first condition for performing measurement, and measuring, by the terminal device, a reference signal based on measurement information that is in the at least one piece of measurement information and that is corresponding to the first condition, where each piece of measurement information in the at least one piece of measurement information indicates a to-be-measured reference signal and corresponds to one or more conditions.

20 Claims, 10 Drawing Sheets

(56) References Cited

U.S. PATENT DOCUMENTS

| | | | |
|---|---|---|---|
| 2019/0069256 A1 | | 2/2019 | Jung et al. |
| 2019/0074887 A1 | | 3/2019 | Yiu et al. |
| 2020/0022073 A1 | * | 1/2020 | Yang .................... H04W 76/11 |
| 2020/0137604 A1 | | 4/2020 | Chen et al. |
| 2021/0099224 A1 | * | 4/2021 | Yeo ....................... H04B 7/088 |

FOREIGN PATENT DOCUMENTS

| | | |
|---|---|---|
| CN | 109104750 A | 12/2018 |
| WO | 2018228317 A1 | 12/2018 |
| WO | 2019040779 A1 | 2/2019 |

OTHER PUBLICATIONS

R1-1810156, Huawei, et al., "UE power consumption reduction in RRM measurements," Chengdu, China, Oct. 8-12, 2018, 4 pages.

R1-1810415, vivo, "On UE Power Consumption Reduction in RRM Measurements," 3GPP TSG RAN WG1 Meeting #94bis, Chengdu, China, Oct. 8-12, 2018, 7 pages.

R1-1812233, Huawei, et al., "UE power consumption reduction in RRM measurements," 3GPP TSG RAN WG1 Meeting #95, Spokane, USA, Nov. 12-16, 2018, 4 pages.

R1-1813013, Samsung, "UE power consumption reduction in RRM measurement," 3GPP TSG RAN WG1 Meeting #95, Spokane, USA, Nov. 12-16, 2018, 5 pages.

R1-1903430, Huawei et al., "Power consumption reduction in RRM measurements," 3GPP TSG RAN WG1 Meeting #96, Athens, Greece, Feb. 25-Mar. 1, 2019, 25 pages.

\* cited by examiner

REFERENCE SIGNAL MEASUREMENT METHOD AND DEVICE

CROSS-REFERENCE TO RELATED APPLICATIONS

This is a U.S. National Stage of International Patent Application No. PCT/CN2020/081719 filed on Mar. 27, 2020, which claims priority to Chinese Patent Application No. 201910239930.5 filed on Mar. 27, 2019, both of which are hereby incorporated by reference in their entireties.

TECHNICAL FIELD

This application relates to the field of communications technologies, and in particular, to a reference signal measurement method and a device.

BACKGROUND

In the current 5th generation (5th generation, 5G) new radio (new radio, NR) or long term evolution (long term evolution, LTE) system, a terminal device in an idle (idle) mode or inactive (inactive) mode (that is, a terminal device that does not establish a radio resource control (radio resource control, RRC) connection to a base station) needs to perform cell reselection when signal quality of a cell (cell) on which the terminal device camps does not meet a threshold, that is, select a new suitable cell to camp on by measuring other cells. To avoid a waste of energy consumed by performing blind search at all related frequencies by the terminal device in the idle mode or inactive mode, the base station usually sends broadcast information to broadcast surrounding frequencies for the terminal device to perform measurement.

In the idle mode or inactive mode, the terminal device performs selection and reselection for an NR cell based on search and measurement of a synchronization signal block (synchronization signal block, SSB). In a connected mode, measurement of an SSB by the terminal device also exists. For example, the terminal device may perform cell handover by measuring an SSB. For measurement of an SSB performed by the terminal device, the base station configures a synchronization signal block-based measurement timing configuration (SSB-based measurement timing configuration, SMTC). Generally, one SMTC is configured for one frequency, and the SMTC may be understood as a time window used for measurement. One SMTC may include, in time domain, SSBs sent by all cells at a frequency corresponding to the SMTC. For example, the base station configures a corresponding SMTC for a frequency f1, and the terminal device measures only an SSB in the SMTC. Therefore, the SMTC includes, in time domain, SSBs that the base station expects the terminal device to measure and that are sent by all cells at the frequency f1.

However, for some terminal devices that meet a specific condition, for example, a terminal device located on a special route such as a city loop, an expressway, or other relatively fixed routes, reselection or handover is generally performed only in cells distributed on the special route. As can be seen, a quantity of cells for reselection or handover may not be large. As described above, currently, one SMTC configured by the base station includes, in time domain, SSBs sent by all cells at a frequency corresponding to the SMTC, and regardless of whether the terminal device is located on a special route, all the SSBs included in the SMTC need to be measured. However, for a terminal device on a special route, the terminal device does not reselect or is not handed over to cells corresponding to some SSBs in the SSBs included in the SMTC. Therefore, measurement of these SSBs may be invalid, but increases power consumption of the terminal device and wastes measurement time.

SUMMARY

Embodiments of this application provide a reference signal measurement method and a device, to reduce power consumption of a terminal device caused by invalid measurement.

According to a first aspect, a first type of reference signal measurement method is provided. The method includes: When performing measurement, a terminal device determines that the terminal device meets a first condition; and the terminal device measures a reference signal based on measurement information that is in at least one piece of measurement information and that is corresponding to the first condition, where each piece of measurement information in the at least one piece of measurement information is used to indicate information about a to-be-measured reference signal, and each piece of measurement information in the at least one piece of measurement information corresponds to one or more conditions.

The method may be performed by a first communications apparatus. The first communications apparatus may be the terminal device or a communications apparatus that can support the terminal device in implementing a function required for the method, for example, a chip system. Herein, an example in which the first communications apparatus is the terminal device is used.

In the embodiment of this application, if the terminal device meets the first condition, the terminal device may measure a reference signal based on the measurement information corresponding to the first condition. This is equivalent to establishing a correspondence between measurement information and a condition. Measurement content corresponding to the measurement information corresponding to the first condition may be determined based on the first condition, so that a requirement corresponding to the first condition can be met, and the terminal device does not need to perform measurement based on measurement information irrelevant to the first condition. For example, the terminal device does not need to perform measurement for a cell irrelevant to the first condition, so that invalid measurement of the terminal device is reduced, power consumption of the terminal device is reduced, and measurement time is reduced.

With reference to the first aspect, in a first possible implementation of the first aspect, the reference signal includes an SSB or a CSI-RS.

The reference signal is not limited in the embodiment of this application. In addition to the SSB and the CSI-RS, the reference signal may be another signal.

With reference to the first possible implementation of the first aspect, in a second possible implementation of the first aspect, the reference signal sent by at least one cell is sent at at least one frequency.

For example, if the reference signal is an SSB, the at least one piece of measurement information may be corresponding to one frequency, and the reference signal sent by the at least one cell may be sent at one frequency. Alternatively, if the reference signal is a CSI-RS, the at least one piece of measurement information may be corresponding to one or more frequencies (one frequency of the one or more frequencies is, for example, a reference frequency, a network device may configure one or more frequency offsets based on the reference frequency, and in this case, a new frequency can be obtained based on the reference frequency and one frequency offset). Therefore, the reference signal sent by the at least one cell may be sent at at least one frequency.

With reference to the first aspect, the first possible implementation of the first aspect, or the second possible implementation of the first aspect, in a third possible implementation of the first aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

When one piece of measurement information in the at least one piece of measurement information is a synchronization signal block-based measurement timing configuration, an SSB included in the synchronization signal block-based measurement timing configuration may be a subset of SSBs included in a measurement time window. Content of the measurement information is not limited in the embodiment of this application, and is relatively flexible.

With reference to any one of the first aspect or the first possible implementation of the first aspect to the third possible implementation of the first aspect, in a fourth possible implementation of the first aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

There are a plurality of possibilities of the first condition. This is not limited in the embodiment of this application.

With reference to the fourth possible implementation of the first aspect, in a fifth possible implementation of the first aspect, when the speed of the terminal device meets a second speed condition, the path on which the terminal device is located is the first path, where the first condition includes that the path on which the terminal device is located is the first path.

If the first condition is a path condition, the path of the terminal device may be determined based on a speed. For example, a terminal device located on a high-speed rail path meets a specific speed. In this case, it may be determined, based on the speed, whether a terminal device is located on the path. This manner of determining whether the terminal device meets the first condition is relatively simple.

With reference to any one of the first aspect or the first possible implementation of the first aspect to the fifth possible implementation of the first aspect, in a sixth possible implementation of the first aspect, before the terminal device measures the reference signal based on the measurement information that is in the at least one piece of measurement information and that is corresponding to the first condition, the method further includes: The terminal device receives the at least one piece of measurement information from the network device.

After determining the at least one piece of measurement information, the network device may send the at least one piece of measurement information to the terminal device, so that the terminal device can perform measurement based on the at least one piece of measurement information.

According to a second aspect, a second type of reference signal measurement method is provided. The method includes: A network device determines at least one piece of measurement information, where each piece of measurement information in the at least one piece of measurement information is used to indicate information about a to-be-measured reference signal, and each piece of measurement information in the at least one piece of measurement information corresponds to one or more conditions; and the network device sends the at least one piece of measurement information to a terminal device, where the at least one piece of measurement information is used by the terminal device to measure a reference signal based on the at least one piece of measurement information.

The method may be performed by a second communications apparatus. The second communications apparatus may be the network device or a communications apparatus that can support the network device in implementing a function required for the method, for example, a chip system. Herein, an example in which the second communications apparatus is the network device is used.

With reference to the second aspect, in a first possible implementation of the second aspect, the reference signal includes an SSB or a CSI-RS.

With reference to the first possible implementation of the second aspect, in a second possible implementation of the second aspect, the reference signal sent by at least one cell is sent at at least one frequency.

With reference to the second aspect, the first possible implementation of the second aspect, or the second possible implementation of the second aspect, in a third possible implementation of the second aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

When one piece of measurement information in the at least one piece of measurement information is a synchronization signal block-based measurement timing configuration, an SSB included in the synchronization signal block-based measurement timing configuration may be a subset of SSBs included in a measurement time window.

For technical effects brought by the second aspect or the implementations of the second aspect, refer to the descriptions of the technical effects of the first aspect or the implementations of the first aspect. Details are not described again.

According to a third aspect, a first type of communication method is provided. The method includes: A terminal device receives M pieces of first information from a network device, and the terminal device performs cell reselection or measurement based on the M pieces of first information or N pieces of second information. All or a portion of the M pieces of first information are used for cell reselection or measurement when the terminal device meets a first condition, and all or a portion of the N pieces of second information are used for cell reselection or measurement when the terminal device does not meet the first condition, where the first information is cell information or frequency information, the second information is cell information or frequency information, and both M and N are positive integers.

The method may be performed by a third communications apparatus. The third communications apparatus may be the terminal device or a communications apparatus that can support the terminal device in implementing a function required for the method, for example, a chip system. Herein, an example in which the third communications apparatus is the terminal device is used.

In the embodiment of this application, when the terminal device meets the first condition, the terminal device may perform cell reselection or measurement by using all or a portion of the M pieces of first information. When the terminal device does not meet the first condition, the terminal device may perform cell reselection or measurement by using all or a portion of the N pieces of second information. In other words, the M pieces of first information are provided for the terminal device that meets the first condition. In this case, for the terminal device that meets the first condition, it may be considered that information about a corresponding cell or frequency is provided in a targeted manner. This helps reduce a quantity of cells or frequencies that need to be measured by the terminal device that meets the first condition, thereby reducing power consumption of the terminal device.

With reference to the third aspect, in a first possible implementation of the third aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

There are a plurality of possibilities of the first condition. This is not limited in the embodiment of this application.

According to a fourth aspect, a second type of communication method is provided. The method includes: A network device determines M pieces of first information, where all or a portion of the M pieces of first information are used for cell reselection or measurement when a terminal device meets a first condition, and all or a portion of N pieces of second information are used for cell reselection or measurement when the terminal device does not meet the first condition, where the first information is cell information or frequency information, the second information is cell information or frequency information, and both M and N are positive integers; and the network device sends the M pieces of first information to the terminal device.

The method may be performed by a fourth communications apparatus. The fourth communications apparatus may be the network device or a communications apparatus that can support the network device in implementing a function required for the method, for example, a chip system. Herein, an example in which the fourth communications apparatus is the network device is used.

With reference to the fourth aspect, in a first possible implementation of the fourth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

For technical effects brought by the fourth aspect or the implementations of the fourth aspect, refer to the descriptions of the technical effects of the third aspect or the implementations of the third aspect. Details are not described again.

According to a fifth aspect, a first type of communications apparatus is provided. For example, the communications apparatus is the first communications apparatus described above. The communications apparatus includes a processor and a memory. Optionally, the communications apparatus may further include a transceiver. The processor, the memory, and the transceiver may be configured to implement the method described in the first aspect or the possible designs of the first aspect. For example, the communications apparatus is a chip disposed in a communications device. For example, the communications device is a terminal device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information through the radio frequency transceiver component.

The memory is configured to store instructions.

The processor is configured to execute the instructions stored in the memory to: determine, when performing measurement, that the terminal device meets a first condition, and measure a reference signal based on measurement information that is in at least one piece of measurement information and that is corresponding to the first condition. Each piece of measurement information in the at least one piece of measurement information is used to indicate information about a to-be-measured reference signal, and each piece of measurement information in the at least one piece of measurement information corresponds to one or more conditions.

With reference to the fifth aspect, in a first possible implementation of the fifth aspect, the reference signal includes an SSB or a CSI-RS.

With reference to the fifth aspect or the first possible implementation of the fifth aspect, in a second possible implementation of the fifth aspect, the reference signal sent by at least one cell is sent at at least one frequency.

With reference to the fifth aspect, the first possible implementation of the fifth aspect, or the second possible implementation of the fifth aspect, in a third possible implementation of the fifth aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

When one piece of measurement information in the at least one piece of measurement information is a synchronization signal block-based measurement timing configuration, an SSB included in the synchronization signal block-based measurement timing configuration may be a subset of SSBs included in a measurement time window.

With reference to any one of the fifth aspect or the first possible implementation of the fifth aspect to the third possible implementation of the fifth aspect, in a fourth possible implementation of the fifth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

With reference to the fourth possible implementation of the fifth aspect, in a fifth possible implementation of the fifth aspect, when the speed of the terminal device meets a second speed condition, the path on which the terminal device is located is the first path, where the first condition includes that the path on which the terminal device is located is the first path.

With reference to any one of the fifth aspect or the first possible implementation of the fifth aspect to the fifth possible implementation of the fifth aspect, in a sixth possible implementation of the fifth aspect, the terminal device further includes a transceiver, and the transceiver is configured to: before the processor measures the reference signal based on the measurement information that is in the at least one piece of measurement information and that is corresponding to the first condition, receive the at least one piece of measurement information from a network device.

For technical effects brought by the fifth aspect or the implementations of the fifth aspect, refer to the descriptions of the technical effects of the first aspect or the implementations of the first aspect. Details are not described again.

According to a sixth aspect, a second type of communications apparatus is provided. For example, the communications apparatus is the second communications apparatus described above. The communications apparatus includes a processor and a memory. Optionally, the communications apparatus may further include a transceiver. The processor, the memory, and the transceiver may be configured to implement the method described in the second aspect or the possible designs of the second aspect. For example, the communications apparatus is a chip disposed in a communications device. For example, the communications device is a network device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information through the radio frequency transceiver component.

The memory is configured to store instructions.

The processor is configured to execute the instructions stored in the memory to: determine at least one piece of measurement information, where each piece of measurement information in the at least one piece of measurement information is used to indicate information about a to-be-measured reference signal, and each piece of measurement information in the at least one piece of measurement information corresponds to one or more conditions.

The transceiver is configured to send the at least one piece of measurement information to a terminal device, where the at least one piece of measurement information is used by the terminal device to measure a reference signal based on the at least one piece of measurement information.

With reference to the sixth aspect, in a first possible implementation of the sixth aspect, the reference signal includes an SSB or a CSI-RS.

With reference to the first possible implementation of the sixth aspect, in a second possible implementation of the sixth aspect, the reference signal sent by at least one cell is sent at at least one frequency.

With reference to the sixth aspect, the first possible implementation of the sixth aspect, or the second possible implementation of the sixth aspect, in a third possible implementation of the sixth aspect, one or any combination of the following is included:
one piece of measurement information in the at least one piece of measurement information is information about a synchronization signal block to measure; or
one piece of measurement information in the at least one piece of measurement information is a synchronization signal block-based measurement timing configuration; or
one piece of measurement information in the at least one piece of measurement information is a measurement timing configuration, where the measurement timing configuration indicates a time window used to measure a CSI-RS; or
one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or
one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or
one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where
the measurement time window is used to indicate the terminal device to measure a reference signal in the measurement time window.

When one piece of measurement information in the at least one piece of measurement information is a synchronization signal block-based measurement timing configuration, an SSB included in the synchronization signal block-based measurement timing configuration may be a subset of SSBs included in a measurement time window.

For technical effects brought by the sixth aspect or the implementations of the sixth aspect, refer to the descriptions of the technical effects of the second aspect or the implementations of the second aspect. Details are not described again.

According to a seventh aspect, a third type of communications apparatus is provided. For example, the communications apparatus is the third communications apparatus described above. The communications apparatus includes a processor and a transceiver, and is configured to implement the method according to any one of the third aspect or the possible designs of the third aspect. For example, the communications apparatus is a chip disposed in a communications device. For example, the communications device is a terminal device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information through the radio frequency transceiver component.

The transceiver is configured to receive M pieces of first information from a network device.

The processor is configured to perform cell reselection or measurement based on the M pieces of first information or N pieces of second information, where all or a portion of the M pieces of first information are used for cell reselection or measurement when the terminal device meets a first condition, and all or a portion of the N pieces of second information are used for cell reselection or measurement when the terminal device does not meet the first condition, where the first information is cell information or frequency information, the second information is cell information or frequency information, and both M and N are positive integers.

With reference to the seventh aspect, in a first possible implementation of the seventh aspect,
the first condition includes that a path on which the terminal device is located is a first path; or
the first condition includes that a path on which the terminal device is located is a first path, and a speed of the terminal device meets a first speed condition; or
the first condition includes that the terminal device meets a third speed condition; or
the first condition includes that a received signal of the terminal device meets a first threshold condition; or
the first condition includes that a path on which the terminal device is located is a first path, and a received signal of the terminal device meets a second threshold condition.

For technical effects brought by the seventh aspect or the implementations of the seventh aspect, refer to the descriptions of the technical effects of the third aspect or the implementations of the third aspect. Details are not described again.

According to an eighth aspect, a fourth type of communications apparatus is provided. For example, the communications apparatus is the fourth communications apparatus described above. The communications apparatus includes a processor and a transceiver, and is configured to implement the method according to any one of the fourth aspect or the possible designs of the fourth aspect. For example, the communications apparatus is a chip disposed in a communications device. For example, the communications device is a network device. For example, the transceiver is implemented by using an antenna, a feeder, and a codec in the communications device. Alternatively, if the communications apparatus is the chip disposed in the communications device, the transceiver is, for example, a communications interface in the chip. The communications interface is connected to a radio frequency transceiver component in the communications device, to receive and send information through the radio frequency transceiver component.

The processor is configured to determine M pieces of first information, where all or a portion of the M pieces of first information are used for cell reselection or measurement when a terminal device meets a first condition, and all or a portion of N pieces of second information are used for cell reselection or measurement when the terminal device does not meet the first condition, where the first information is cell information or frequency information, the second information is cell information or frequency information, and both M and N are positive integers.

The transceiver is configured to send the M pieces of first information to the terminal device.

With reference to the eighth aspect, in a first possible implementation of the eighth aspect,
the first condition includes that a path on which the terminal device is located is a first path; or
the first condition includes that a path on which the terminal device is located is a first path, and a speed of the terminal device meets a first speed condition; or
the first condition includes that the terminal device meets a third speed condition; or
the first condition includes that a received signal of the terminal device meets a first threshold condition; or
the first condition includes that a path on which the terminal device is located is a first path, and a received signal of the terminal device meets a second threshold condition.

For technical effects brought by the eighth aspect or the implementations of the eighth aspect, refer to the descriptions of the technical effects of the fourth aspect or the implementations of the fourth aspect. Details are not described again.

According to a ninth aspect, a fifth type of communications apparatus is provided. For example, the communications apparatus is the first communications apparatus described above. The communications apparatus is configured to perform the method according to any one of the first aspect or the possible implementations of the first aspect. Specifically, the communications apparatus may include modules configured to perform the method according to any one of the first aspect or the possible implementations of the first aspect, for example, include a processing module and a storage module that are coupled to each other, and optionally further include a transceiver module. For example, the communications apparatus is a communications device. For example, the communications device is a terminal device.

The storage module is configured to store instructions.

The processing module is configured to execute the instructions stored in the storage module to: determine, when performing measurement, that the terminal device meets a first condition, and measure a reference signal based on measurement information that is in at least one piece of measurement information and that is corresponding to the first condition. Each piece of measurement information in the at least one piece of measurement information is used to indicate information about a to-be-measured reference signal, and each piece of measurement information in the at least one piece of measurement information corresponds to one or more conditions.

With reference to the ninth aspect, in a first possible implementation of the ninth aspect, the reference signal includes an SSB or a CSI-RS.

With reference to the ninth aspect or the first possible implementation of the ninth aspect, in a second possible implementation of the ninth aspect, the reference signal sent by at least one cell is sent at at least one frequency.

With reference to the ninth aspect, the first possible implementation of the ninth aspect, or the second possible implementation of the ninth aspect, in a third possible implementation of the ninth aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

When one piece of measurement information in the at least one piece of measurement information is a synchronization signal block-based measurement timing configuration, an SSB included in the synchronization signal block-based measurement timing configuration may be a subset of SSBs included in a measurement time window.

With reference to any one of the ninth aspect or the first possible implementation of the ninth aspect to the third possible implementation of the ninth aspect, in a fourth possible implementation of the ninth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

With reference to the fourth possible implementation of the ninth aspect, in a fifth possible implementation of the ninth aspect, when the speed of the terminal device meets a second speed condition, the path on which the terminal device is located is the first path, where the first condition includes that the path on which the terminal device is located is the first path.

With reference to any one of the ninth aspect or the first possible implementation of the ninth aspect to the fifth possible implementation of the ninth aspect, in a sixth possible implementation of the ninth aspect, the transceiver module is configured to: before the processing module measures the reference signal based on the measurement information that is in the at least one piece of measurement information and that is corresponding to the first condition, receive the at least one piece of measurement information from a network device.

For technical effects brought by the ninth aspect or the implementations of the ninth aspect, refer to the descriptions of the technical effects of the first aspect or the implementations of the first aspect. Details are not described again.

According to a tenth aspect, a sixth type of communications apparatus is provided. For example, the communications apparatus is the second communications apparatus described above. The communications apparatus is configured to perform the method according to any one of the second aspect or the possible implementations of the second aspect. Specifically, the communications apparatus may include modules configured to perform the method according to any one of the second aspect or the possible implementations of the second aspect, for example, include a processing module and a storage module that are coupled to each other, and optionally further include a transceiver module. For example, the communications apparatus is a communications device. For example, the communications device is a network device.

The storage module is configured to store instructions.

The processing module is configured to execute the instructions stored in the storage module to: determine at least one piece of measurement information, where each piece of measurement information in the at least one piece of measurement information is used to indicate information about a to-be-measured reference signal, and each piece of measurement information in the at least one piece of measurement information corresponds to one or more conditions.

The transceiver module is configured to send the at least one piece of measurement information to a terminal device, where the at least one piece of measurement information is used by the terminal device to measure a reference signal based on the at least one piece of measurement information.

With reference to the tenth aspect, in a first possible implementation of the tenth aspect, the reference signal includes an SSB or a CSI-RS.

With reference to the first possible implementation of the tenth aspect, in a second possible implementation of the tenth aspect, the reference signal sent by at least one cell is sent at at least one frequency.

With reference to the tenth aspect, the first possible implementation of the tenth aspect, or the second possible implementation of the tenth aspect, in a third possible implementation of the tenth aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration, and an SSB included in the synchronization signal block-based measurement timing configuration is a subset of SSBs included in a measurement time window; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

When one piece of measurement information in the at least one piece of measurement information is a synchronization signal block-based measurement timing configuration, an SSB included in the synchronization signal block-based measurement timing configuration may be a subset of SSBs included in a measurement time window.

For technical effects brought by the tenth aspect or the implementations of the tenth aspect, refer to the descriptions of the technical effects of the second aspect or the implementations of the second aspect. Details are not described again.

According to an eleventh aspect, a seventh type of communications apparatus is provided. For example, the communications apparatus is the third communications apparatus described above. The communications apparatus is configured to perform the method according to any one of the third aspect or the possible implementations of the third aspect. Specifically, the communications apparatus may include modules configured to perform the method according to any one of the third aspect or the possible implementations of the third aspect, for example, include a processing module and a transceiver module that are coupled to each other. For example, the communications apparatus is a communications device. For example, the communications device is a terminal device.

The transceiver module is configured to receive M pieces of first information from a network device.

The processing module is configured to perform cell reselection or measurement based on the M pieces of first information or N pieces of second information, where all or a portion of the M pieces of first information are used for cell reselection or measurement when the terminal device meets a first condition, and all or a portion of the N pieces of second information are used for cell reselection or measurement when the terminal device does not meet the first condition, where the first information is cell information or frequency information, the second information is cell information or frequency information, and both M and N are positive integers.

With reference to the eleventh aspect, in a first possible implementation of the eleventh aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

For technical effects brought by the eleventh aspect or the implementations of the eleventh aspect, refer to the descriptions of the technical effects of the third aspect or the implementations of the third aspect. Details are not described again.

According to a twelfth aspect, an eighth type of communications apparatus is provided. For example, the communications apparatus is the fourth communications apparatus described above. The communications apparatus is configured to perform the method according to any one of the fourth aspect or the possible implementations of the fourth aspect. Specifically, the communications apparatus may include modules configured to perform the method according to any one of the fourth aspect or the possible implementations of the fourth aspect, for example, include a processing module and a transceiver module that are coupled to each other. For example, the communications apparatus is a communications device. For example, the communications device is a network device.

The processing module is configured to determine M pieces of first information, where all or a portion of the M pieces of first information are used for cell reselection or measurement when a terminal device meets a first condition, and all or a portion of N pieces of second information are used for cell reselection or measurement when the terminal device does not meet the first condition, where the first information is cell information or frequency information, the second information is cell information or frequency information, and both M and N are positive integers.

The transceiver module is configured to send the M pieces of first information to the terminal device.

With reference to the twelfth aspect, in a first possible implementation of the twelfth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

For technical effects brought by the twelfth aspect or the implementations of the twelfth aspect, refer to the descriptions of the technical effects of the fourth aspect or the implementations of the fourth aspect. Details are not described again.

According to a thirteenth aspect, a ninth type of communications apparatus is provided. The communications apparatus may be the first communications apparatus in the foregoing method designs. For example, the communications apparatus is a chip disposed in a terminal device. The communications apparatus includes: a memory, configured to store computer-executable program code; and a processor, where the processor is coupled to the memory. The program code stored in the memory includes instructions, and when the processor executes the instructions, the ninth type of communications apparatus is enabled to perform the method according to any one of the first aspect or the possible implementations of the first aspect.

The ninth type of communications apparatus may further include a communications interface. The communications interface may be a transceiver in the terminal device, and is implemented by using, for example, an antenna, a feeder, and a codec in the communications apparatus. Alternatively, if the ninth type of communications apparatus is a chip disposed in the terminal device, the communications interface may be an input/output interface of the chip, for example, an input/output pin.

According to a fourteenth aspect, a tenth type of communications apparatus is provided. The communications apparatus may be the second communications apparatus in the foregoing method designs. For example, the communications apparatus is a chip disposed in a network device. The communications apparatus includes: a memory, configured to store computer-executable program code; and a processor, where the processor is coupled to the memory. The program code stored in the memory includes instructions. When the processor executes the instructions, the tenth type of communications apparatus is enabled to perform the method according to any one of the second aspect or the possible implementations of the second aspect.

The tenth type of communications apparatus may further include a communications interface. The communications interface may be a transceiver in the network device, and is implemented by using, for example, an antenna, a feeder, and a codec in the communications apparatus. Alternatively, if the tenth type of communications apparatus is the chip disposed in the network device, the communications interface may be an input/output interface of the chip, for example, an input/output pin.

According to a fifteenth aspect, an eleventh type of communications apparatus is provided. The communications apparatus may be the third communications apparatus in the foregoing method designs. For example, the communications apparatus is a chip disposed in a terminal device. The communications apparatus includes: a memory, configured to store computer-executable program code; and a processor, where the processor is coupled to the memory. The program code stored in the memory includes instructions. When the processor executes the instructions, the eleventh type of communications apparatus is enabled to perform the method according to any one of the third aspect or the possible implementations of the third aspect.

The eleventh type of communications apparatus may further include a communications interface. The communications interface may be a transceiver in the terminal device, and is implemented by using, for example, an antenna, a feeder, and a codec in the communications apparatus. Alternatively, if the eleventh type of communications apparatus is a chip disposed in the terminal device, the communications interface may be an input/output interface of the chip, for example, an input/output pin.

According to a sixteenth aspect, a twelfth type of communications apparatus is provided. The communications apparatus may be the fourth communications apparatus in the foregoing method designs. For example, the communications apparatus is a chip disposed in a network device. The communications apparatus includes: a memory, configured to store computer-executable program code; and a processor, where the processor is coupled to the memory. The program code stored in the memory includes instructions. When the processor executes the instructions, the twelfth type of communications apparatus is enabled to perform the method according to any one of the fourth aspect or the possible implementations of the fourth aspect.

The twelfth type of communications apparatus may further include a communications interface. The communications interface may be a transceiver in the network device, and is implemented by using, for example, an antenna, a feeder, and a codec in the communications apparatus. Alternatively, if the twelfth type of communications apparatus is the chip disposed in the network device, the communications interface may be an input/output interface of the chip, for example, an input/output pin.

According to a seventeenth aspect, a third type of reference signal measurement method is provided, where the method includes:

a network device determines at least one piece of measurement information, where each piece of measurement information in the at least one piece of measurement information is used to indicate information about a to-be-measured reference signal, and each piece of measurement information in the at least one piece of measurement information corresponds to one or more conditions;

the network device sends the at least one piece of measurement information to a terminal device, where the at least one piece of measurement information is used by the terminal device to measure a reference signal based on the at least one piece of measurement information;

when performing measurement, the terminal device determines that the terminal device meets a first condition; and the terminal device measures a reference signal based on measurement information that is in the at least one piece of measurement information and that is corresponding to the first condition, where each piece of measurement information in the at least one piece of measurement information is used to indicate information about a to-be-measured reference signal, and each piece of measurement information in the at least one piece of measurement information corresponds to one or more conditions.

With reference to the seventeenth aspect, in a first possible implementation of the seventeenth aspect, the reference signal includes an SSB or a CSI-RS.

With reference to the seventeenth aspect or the first possible implementation of the seventeenth aspect, in a second possible implementation of the seventeenth aspect, the reference signal sent by at least one cell is sent at at least one frequency.

With reference to the seventeenth aspect, the first possible implementation of the seventeenth aspect, or the second possible implementation of the seventeenth aspect, in a third possible implementation of the seventeenth aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

With reference to any one of the seventeenth aspect or the first possible implementation of the seventeenth aspect to the third possible implementation of the seventeenth aspect, in a fourth possible implementation of the seventeenth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

With reference to the fourth possible implementation of the seventeenth aspect, in a fifth possible implementation of the seventeenth aspect, when the speed of the terminal device meets a second speed condition, the path on which the terminal device is located is the first path, where the first condition includes that the path on which the terminal device is located is the first path.

With reference to any one of the seventeenth aspect or the first possible implementation of the seventeenth aspect to the fifth possible implementation of the seventeenth aspect, in a sixth possible implementation of the seventeenth aspect, before the terminal device measures the reference signal based on the measurement information that is in the at least one piece of measurement information and that is corresponding to the first condition, the method further includes:

The terminal device receives the at least one piece of measurement information from the network device.

For technical effects brought by the seventeenth aspect or the implementations of the seventeenth aspect, refer to the descriptions of the technical effects of the first aspect or the implementations of the first aspect, or refer to the descriptions of the technical effects of the second aspect or the implementations of the second aspect. Details are not described again.

According to an eighteenth aspect, a first type of communications system is provided. The communications system may include a network device and a terminal device. For example, the network device is a base station.

The network device is configured to determine at least one piece of measurement information, and send the at least one piece of measurement information to the terminal device, where each piece of measurement information in the at least one piece of measurement information is used to indicate information about a to-be-measured reference signal, each piece of measurement information in the at least one piece of measurement information corresponds to one or more conditions, and the at least one piece of measurement information is used by the terminal device to measure a reference signal based on the at least one piece of measurement information.

The terminal device is configured to: determine, when performing measurement, that the terminal device meets a first condition, and measure a reference signal based on measurement information that is in the at least one piece of measurement information and that is corresponding to the first condition. Each piece of measurement information in the at least one piece of measurement information is used to indicate information about a to-be-measured reference signal, and each piece of measurement information in the at least one piece of measurement information corresponds to one or more conditions.

With reference to the eighteenth aspect, in a first possible implementation of the eighteenth aspect, the reference signal includes an SSB or a CSI-RS.

With reference to the eighteenth aspect or the first possible implementation of the eighteenth aspect, in a second possible implementation of the eighteenth aspect, the reference signal sent by at least one cell is sent at at least one frequency.

With reference to the eighteenth aspect, the first possible implementation of the eighteenth aspect, or the second possible implementation of the eighteenth aspect, in a third possible implementation of the eighteenth aspect, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

With reference to any one of the eighteenth aspect or the first possible implementation of the eighteenth aspect to the third possible implementation of the eighteenth aspect, in a fourth possible implementation of the eighteenth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

With reference to the fourth possible implementation of the eighteenth aspect, in a fifth possible implementation of the eighteenth aspect, when the speed of the terminal device meets a second speed condition, the path on which the terminal device is located is the first path, where the first condition includes that the path on which the terminal device is located is the first path.

With reference to any one of the eighteenth aspect or the first possible implementation of the eighteenth aspect to the fifth possible implementation of the eighteenth aspect, in a sixth possible implementation of the eighteenth aspect, the terminal device is further configured to: before the terminal device measures the reference signal based on the measurement information that is in the at least one piece of measurement information and that is corresponding to the first condition, receive the at least one piece of measurement information from the network device.

For technical effects brought by the eighteenth aspect or the implementations of the eighteenth aspect, refer to the descriptions of the technical effects of the first aspect or the implementations of the first aspect, or refer to the descriptions of the technical effects of the second aspect or the implementations of the second aspect. Details are not described again.

According to a nineteenth aspect, a third type of communication method is provided, where the method includes:

a network device determines M pieces of first information, where all or a portion of the M pieces of first information are used for cell reselection or measurement when a terminal device meets a first condition, and all or a portion of N pieces of second information are used for cell reselection or measurement when the terminal device does not meet the first condition, where the first information is cell information or frequency information, the second information is cell information or frequency information, and both M and N are positive integers;

the network device sends the M pieces of first information to the terminal device;

the terminal device receives the M pieces of first information from the network device; and the terminal device performs cell reselection or measurement based on the M pieces of first information or the N pieces of second information, where all or a portion of the M pieces of first information are used for cell reselection or measurement when the terminal device meets the first condition, and all or a portion of the N pieces of second information are used for cell reselection or measurement when the terminal device does not meet the first condition, where the first information is cell information or frequency information, the second information is cell information or frequency information, and both M and N are positive integers.

With reference to the nineteenth aspect, in a first possible implementation of the nineteenth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

For technical effects brought by the nineteenth aspect or the implementations of the nineteenth aspect, refer to the descriptions of the technical effects of the third aspect or the implementations of the third aspect, or refer to the descriptions of the technical effects of the fourth aspect or the implementations of the fourth aspect. Details are not described again.

According to a twentieth aspect, a second type of communications system is provided. The communications system includes a network device and a terminal device. For example, the network device is a base station.

The network device is configured to determine M pieces of first information, and send the M pieces of first information to the terminal device. All or a portion of the M pieces of first information are used for cell reselection or measurement when the terminal device meets a first condition, and all or a portion of N pieces of second information are used for cell reselection or measurement when the terminal device does not meet the first condition, where the first information is cell information or frequency information, the second information is cell information or frequency information, and both M and N are positive integers.

The terminal device is configured to receive the M pieces of first information from the network device, and perform cell reselection or measurement based on the M pieces of first information or the N pieces of second information, where all or a portion of the M pieces of first information are used for cell reselection or measurement when the terminal device meets the first condition, and all or a portion of the N pieces of second information are used for cell reselection or measurement when the terminal device does not meet the first condition, where the first information is cell information or frequency information, the second information is cell information or frequency information, and both M and N are positive integers.

With reference to the twentieth aspect, in a first possible implementation of the twentieth aspect, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or the first condition includes that a path on which the terminal device is located is a first path, and a received signal of the terminal device meets a second threshold condition.

For technical effects brought by the twentieth aspect or the implementations of the twentieth aspect, refer to the descriptions of the technical effects of the third aspect or the implementations of the third aspect, or refer to the descriptions of the technical effects of the fourth aspect or the implementations of the fourth aspect. Details are not described again.

According to a twenty-first aspect, a third type of communications system is provided. The communications system may include the first type of communications apparatus in the fifth aspect, the fifth type of communications apparatus in the ninth aspect, or the ninth type of communications apparatus in the thirteenth aspect, and includes the second type of communications apparatus in the sixth aspect, the sixth type of communications apparatus in the tenth aspect, or the tenth type of communications apparatus in the fourteenth aspect.

The third type of communications system and the first type of communications system provided in the eighteenth aspect may be a same communications system.

According to a twenty-second aspect, a fourth type of communications system is provided. The communications system may include the third type of communications apparatus in the seventh aspect, the seventh type of communications apparatus in the eleventh aspect, or the eleventh type of communications apparatus in the fifteenth aspect, and includes the fourth type of communications apparatus in the eighth aspect, the eighth type of communications apparatus in the twelfth aspect, or the twelfth type of communications apparatus in the sixteenth aspect.

The fourth type of communications system and the second type of communications system provided in the twentieth aspect may be a same communications system.

According to a twenty-third aspect, a computer storage medium is provided. The computer-readable storage medium stores instructions. When the instructions are run on a computer, the computer is enabled to perform the method in any one of the first aspect or the possible designs of the first aspect.

According to a twenty-fourth aspect, a computer storage medium is provided. The computer-readable storage medium stores instructions. When the instructions are run on a computer, the computer is enabled to perform the method in any one of the second aspect or the possible designs of the second aspect.

According to a twenty-fifth aspect, a computer storage medium is provided. The computer-readable storage medium stores instructions. When the instructions are run on a computer, the computer is enabled to perform the method in any one of the third aspect or the possible designs of the third aspect.

According to a twenty-sixth aspect, a computer storage medium is provided. The computer-readable storage medium stores instructions. When the instructions are run on a computer, the computer is enabled to perform the method in any one of the fourth aspect or the possible designs of the fourth aspect.

According to a twenty-seventh aspect, a computer program product including instructions is provided. The computer program product stores the instructions. When the computer program product runs on a computer, the computer is enabled to perform the method in any one of the first aspect or the possible designs of the first aspect.

According to a twenty-eighth aspect, a computer program product including instructions is provided. The computer program product stores the instructions. When the computer program product runs on a computer, the computer is enabled to perform the method in any one of the second aspect or the possible designs of the second aspect.

According to a twenty-ninth aspect, a computer program product including instructions is provided. The computer program product stores the instructions. When the computer program product runs on a computer, the computer is enabled to perform the method in any one of the third aspect or the possible designs of the third aspect.

According to a thirtieth aspect, a computer program product including instructions is provided. The computer program product stores the instructions. When the computer program product runs on a computer, the computer is enabled to perform the method according to any one of the fourth aspect or the possible designs of the fourth aspect.

Briefly, in the embodiments of this application, the terminal device measures a reference signal based on measurement information corresponding to a met condition. In this way, measurement content corresponding to the measurement information may be determined based on a corresponding condition, and meets a requirement corresponding to the corresponding condition, and the terminal device can be prevented from performing measurement based on measurement information irrelevant to the condition, so that invalid measurement performed by the terminal device is reduced, power consumption of the terminal device is reduced, and measurement time is reduced.

DESCRIPTION OF EMBODIMENTS

Figure 1:
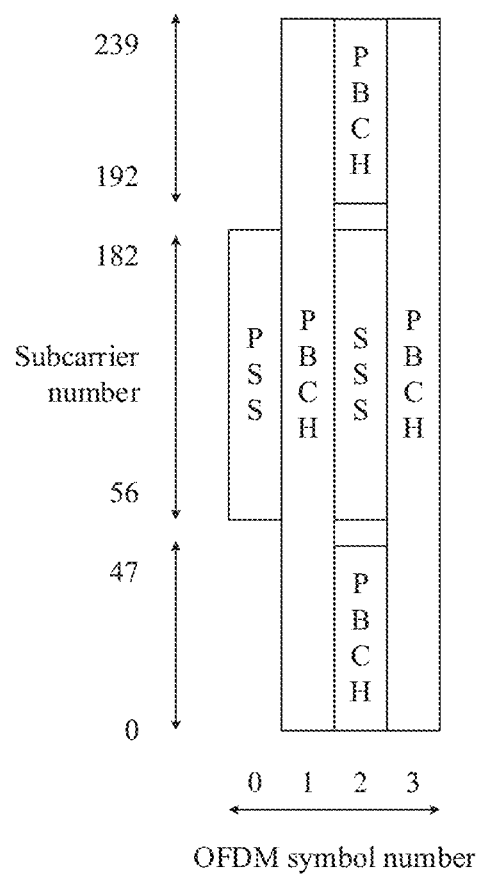
FIG. 1 is a schematic diagram of an existing SSB.

To make the objectives, the technical solutions, and advantages of the embodiments of this application clearer, the following further describes the embodiments of this application in detail with reference to the accompanying drawings.

The following describes some terms in the embodiments of this application, to facilitate understanding of a person skilled in the art.

(1) A terminal device includes a device that provides a user with voice and/or data connectivity, for example, may include a handheld device having a wireless connection function, or a processing device connected to a wireless modem. The terminal device may communicate with a core network through a radio access network (radio access network, RAN), and exchange voice and/or data with the RAN. The terminal device may include user equipment (user equipment, UE), a wireless terminal device, a mobile terminal device, a device-to-device (device-to-device, D2D) communication terminal device, a vehicle-to-everything (vehicle-to-everything, V2X) terminal device, a machine-to-machine/machine-type communications (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal device may include a mobile phone (or referred to as a "cellular" phone), a computer with a mobile terminal device, a portable, pocket-sized, handheld, or computer built-in mobile apparatus, or the like. For example, the terminal device is a device such as a personal communications service (personal communications service, PCS) phone, a cordless phone, a session initiation protocol (session initiation protocol, SIP) phone, a wireless local loop (wireless local loop, WLL) station, or a personal digital assistant (personal digital assistant, PDA). The terminal device further includes a limited device, for example, a device having low power consumption, a device having a limited storage capability, or a device having a limited computing capability. For example, the terminal device includes an information sensing device, for example, a barcode, radio frequency identification (radio frequency identification, RFID), a sensor, a global positioning system (global positioning system, GPS), or a laser scanner.

By way of example, but not limitation, the terminal device in the embodiments of this application may alternatively be a wearable device. The wearable device may also be referred to as a wearable intelligent device, an intelligent wearable device, or the like, and is a generic term for wearable devices that are developed by applying wearable technologies to intelligently design daily wear, such as glasses, gloves, watches, clothes, and shoes. The wearable device is a portable device that is directly worn on a body or integrated into clothes or an accessory of the user. The wearable device is not only a hardware device, but also implements a powerful function through software support, data exchange, and cloud interaction. In a broad sense, the wearable intelligent device includes full-featured and large-sized devices that can implement all or some functions without depending on smartphones, for example, smart watches or smart glasses, and devices that focus on only one type of application function and need to work with other devices such as smartphones, for example, various smart bands, smart helmets, or smart jewelry for monitoring physical signs.

However, if the various terminal devices described above are located on a vehicle (for example, placed inside the vehicle or mounted inside the vehicle), the terminal devices may be considered as vehicle-mounted terminal devices. For example, the vehicle-mounted terminal devices are also referred to as on-board units (on-board unit, OBU).

(2) A network device includes, for example, an access network (access network, AN) device such as a base station (for example, an access point), and may be a device that communicates with a wireless terminal device over an air interface through one or more cells in an access network. Alternatively, for example, a network device in a V2X technology is a road side unit (road side unit, RSU). The base station may be configured to mutually convert a received over-the-air frame and a received internet protocol (IP) packet, and serve as a router between the terminal device and the other parts of the access network, where the other parts of the access network may include an IP network. The RSU may be a fixed infrastructure entity supporting application of the V2X, and may exchange a message with another entity supporting application of the V2X. The network device may further coordinate attribute management of the air interface. For example, the network device may include an evolved NodeB (NodeB, eNB, or e-NodeB, evolved NodeB) in an LTE system or a long term evolution-advanced (long term evolution-advanced, LTE-A) system, may include a next generation NodeB (next generation NodeB, gNB) in a 5G NR system, or may include a centralized unit (centralized unit, CU) and a distributed unit (distributed unit, DU) in a cloud access network (cloud radio access network, Cloud RAN) system. This is not limited in the embodiments of this application.

Certainly, the network device may further include a core network device. However, the technical solutions provided in the embodiments of this application mainly relate to an access network device. Therefore, unless otherwise specified, "network device" described below is an access network device.

(3) "At least one" means one or more, and "a plurality of" means two or more than two. The term "and/or" describes an association relationship between associated objects and represents that three relationships may exist. For example, A and/or B may represent the following three cases: Only A exists, both A and B exist, and only B exists. A and B may be singular or plural. The character "/" generally indicates an "or" relationship between the associated objects. "At least one item (piece) of the following" or a similar expression thereof means any combination of these items, including a singular item (piece) or any combination of plural items (pieces). For example, at least one item (piece) of a, b, or c may represent: a, b, c, a-b, a-c, b-c, or a-b-c, where a, b, and c may be singular or plural.

In addition, unless otherwise stated, ordinal numbers such as "first" and "second" in the embodiments of this application are used to distinguish between a plurality of objects, but are not intended to limit a sequence, a time sequence, priorities, or importance of the plurality of objects. For example, first information and second information are merely used to distinguish different signaling, but do not indicate different content, priorities, sending sequences, importance, or the like of the two types of information.

The foregoing describes some concepts in the embodiments of this application. The following describes technical features in the embodiments of this application.

In the current 5G NR or LTE system, a terminal device in an idle mode or in an inactive mode (that is, a terminal device that has not established an RRC connection to a base station) needs to perform cell reselection when signal quality of a cell on which the terminal device is camped does not meet a threshold, that is, select a new proper cell to camp on by measuring other cells. To avoid a waste of energy consumed by performing blind search at all related frequencies by the terminal device in the idle mode or inactive mode, the base station generally sends broadcast information to broadcast a neighboring cell list, an adjacent frequency list, or the like for the terminal device to perform measurement. In the NR system, a base station broadcasts intra-frequency neighboring cell information by using a system information block (system information block, SIB) 3, and broadcasts adjacent-frequency neighboring cell information by using a SIB4. In the LTE system, a base station broadcasts intra-frequency neighboring cell information by using a SIB4, broadcasts adjacent-frequency information and adjacent-frequency neighboring cell information by using a SIB5, and further broadcasts NR system-related cell reselection information by using a SIB24.

An intra-frequency neighboring cell is a neighboring cell whose frequency is the same as a frequency of the cell on which the terminal device currently camps. An adjacent frequency is a frequency adjacent to the frequency of the cell on which the terminal device currently camps. An adjacent-frequency neighboring cell is a cell on a frequency adjacent to the frequency of the cell on which the terminal device currently camps. For example, the cell on which the terminal device currently camps works on a frequency f1. The intra-frequency neighboring cell is a neighboring cell that can be found or detected at the frequency f1 within coverage of the cell. The adjacent frequency is a frequency, different from the frequency of the cell, of a neighboring cell that can be found or detected within the coverage of the cell on which the terminal device currently camps. The adjacent-frequency neighboring cell refers to all neighboring cells, on all frequencies, that can be found or detected at a frequency different from the frequency of the cell within the coverage of the cell on which the terminal device currently camps.

For a terminal device in a connected (connected) mode (that is, a terminal device that has established an RRC connection to the base station), similarly, the base station configures a measurement object (measurement object, MO) for the terminal device in the connected mode, and provides a cell list corresponding to the MO for the terminal device to perform measurement. The MO is corresponding frequencies. That is, the base station configures corresponding frequencies and cells on the frequencies for the terminal device in the connected mode to perform measurement.

In the idle mode or inactive mode, the terminal device performs selection and reselection for an NR cell based on search and measurement of an SSB. In the connected mode, measurement of an SSB by the terminal device also exists. For example, the terminal device may perform cell handover by measuring an SSB.

A primary synchronization signal (primary synchronization signal, PSS), a secondary synchronization signal (secondary synchronization signal, SSS), and a physical broadcast channel (physical broadcast channel, PBCH) together form an SSB. As shown in FIG. 1, in time domain, one SSB occupies four orthogonal frequency division multiplexing (orthogonal frequency division multiplexing, OFDM) symbols (symbol), which are a symbol 0 to a symbol 3. In frequency domain, one SSB occupies 20 resource blocks (resource block, RB), that is, 240 subcarriers. In the 20 RBs, subcarrier numbers are 0 to 239. The PSS is located on the middle 127 subcarriers in the symbol 0, and the SSS is located on the middle 127 subcarriers in the symbol 2. To protect the PSS and the SSS, energy of different guard subcarriers is set to 0, that is, the guard subcarriers are not used to carry signals, and eight subcarriers and nine subcarriers are respectively reserved on two sides of the SSS as guard band carriers. In FIG. 1, blank areas on upper and lower sides of the SSS are guard subcarriers. The PBCH occupies all subcarriers in the symbol 1 and the symbol 3, and some subcarriers (subcarriers in remaining subcarriers other than guard subcarriers) in the remaining subcarriers other than the subcarriers occupied by the SSS in all subcarriers in the symbol 2.

Figure 2:
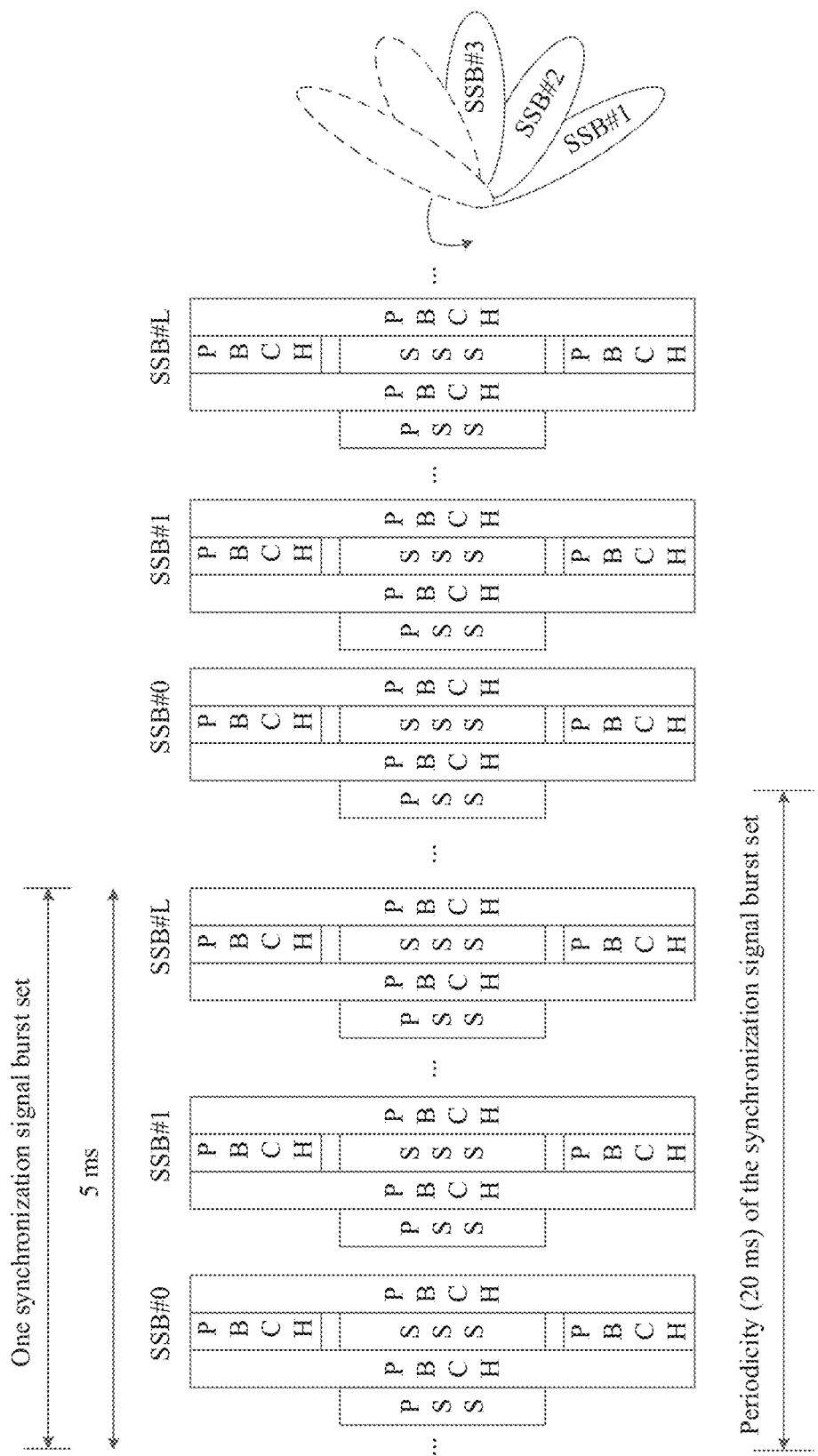
FIG. 2 is a schematic diagram of an SS burst set.

A synchronization burst set (synchronization signal burst set, SS burst set) is a set of SSBs included in one beam sweep (beam sweep). An SS burst set periodicity is a periodicity of an SSB corresponding to a specific beam, and may be configured as 5 ms (millisecond), 10 ms, 20 ms, 40 ms, 80 ms, 160 ms, or the like. 20 ms is a default periodicity, that is, a periodicity assumed when the terminal device initially searches for a cell. Currently, one SS burst set periodicity has a maximum of $L_{max}$ SSBs, where $L_{max}$=4, 8, or 64. When a carrier frequency is less than or equal to 3 GHz, Lmax=4. To be specific, there are a maximum of four SSBs in one SS burst set periodicity, and a maximum of four beam sweeps can be supported. Each SS burst set is always within an interval of 5 ms, and is a first half part or a second half part of a frame (frame) of 10 ms. For a schematic diagram of the SS burst set, refer to FIG. 2. In FIG. 2, an example in which an SS burst set periodicity is 20 ms and one SS burst set includes L SSBs is used.

From a perspective of the terminal device, for SSB measurement and search of different cells, the base station first provides frequency information in the foregoing manner. There may be a plurality of cells on one frequency. The base station provides a corresponding SMTC for the frequency. The terminal device only needs to measure, in the SMTC, SSBs sent by different cells at the frequency. One SMTC may include, in time domain, SSBs sent by all cells at the frequency corresponding to the SMTC. For example, for a frequency f1, SSBs sent by a plurality of cells at the frequency f1 are placed in one SMTC, and a length of the SMTC may be configured to be, for example, 1 ms, 2 ms, . . . , or 5 ms. In one SMTC, the terminal device may distinguish, based on orthogonal characteristics of synchronization signals of different cells, SSBs sent by the different cells.

Figure 3:
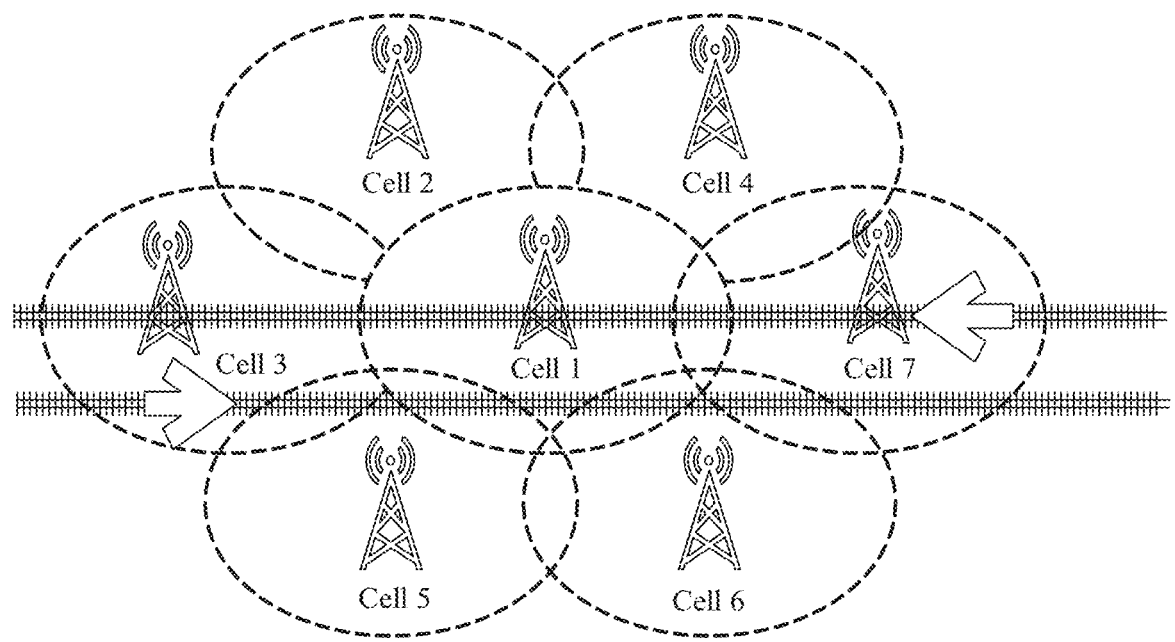
FIG. 3 is a schematic diagram of cells that can be selected when a terminal device located on a special path performs handover or reselection.

However, for some special routes, such as a high-speed railway line or a city loop, the route is relatively obvious, and a path of a terminal device moving on such a special route can be predicted with a high probability. A terminal device moving on a special route basically performs handover or reselection between cells distributed along the special route. For example, FIG. 3 is a schematic diagram of a special route. An arrow in FIG. 3 is used to indicate a route, and FIG. 3 includes two fixed routes from right to left and from left to right. For example, a fixed route from right to left is referred to as route 1, and a fixed route from left to right is referred to as route 2. It can be learned that cells distributed along the route 1 include a cell 7, a cell 1, and a cell 3, and cells distributed along the route 2 include the cell 3, the cell 1, and the cell 7. A terminal device moving on the route 1 generally performs handover or reselection between the cell 7, the cell 1, and the cell 3, and generally does not reselect or is not handed over to a cell 2, a cell 4, a cell 5, or a cell 6. Similarly, a terminal device moving on the route 2 generally performs handover or reselection between the cell 3, the cell 1, and the cell 7, and generally does not reselect or is not handed over to the cell 2, the cell 4, the cell 5, or the cell 6.

Therefore, for some terminal devices that meet a specific condition, for example, a terminal device moving on a city loop, an expressway, or other relatively fixed routes, reselection or handover is generally performed only between cells distributed along the special route. As can be seen, a quantity of cells for reselection or handover may not be large. As described above, currently, one SMTC configured by the base station includes, in time domain, SSBs sent by all cells at a frequency corresponding to the SMTC, and regardless of whether the terminal device is located on a special route, all the SSBs included in the SMTC need to be measured. However, for a terminal device on a special route, the terminal device is not to reselect or be handed over to cells corresponding to some SSBs in the SSBs included in the SMTC. Therefore, measurement of these SSBs is probably invalid, but increases power consumption of the terminal device and wastes measurement time. FIG. 3 is still used as an example. For example, frequencies of all the cells in FIG. 3 are a frequency f1. An SMTC that is configured by the base station and that is corresponding to the frequency f1 includes SSBs sent by all the cells in FIG. 3. For the terminal device moving on the route 1, because measurement needs to be performed based on the SMTC configured by the base station, all the SSBs included in the SMTC are measured. However, the terminal device moving on the route 1 usually is not to reselect or be handed over to the cell 2, the cell 4, the cell 5, or the cell 6. Therefore, measurement of SSBs sent by these cells may be considered as invalid measurement, but increases power consumption of the terminal device and wastes measurement time.

In view of this, the technical solutions in the embodiments of this application are provided. In the embodiments of this application, if a terminal device meets a first condition, the terminal device may measure a reference signal based on measurement information corresponding to the first condition. This is equivalent to establishing a correspondence between measurement information and a condition. Measurement content corresponding to the measurement information corresponding to the first condition may be determined based on the first condition, so that a requirement corresponding to the first condition can be met, and the terminal device does not need to perform measurement based on measurement information irrelevant to the first condition. For example, the terminal device does not need to perform measurement for a cell irrelevant to the first condition, so that invalid measurement of the terminal device is reduced, power consumption of the terminal device is reduced, and measurement time is reduced.

The technical solutions provided in the embodiments of this application may be applied to a 5G system, for example, an NR system, or may be applied to an LTE system, or may be applied to a next generation mobile communications system or another similar communications system. This is not specifically limited.

Figure 4:
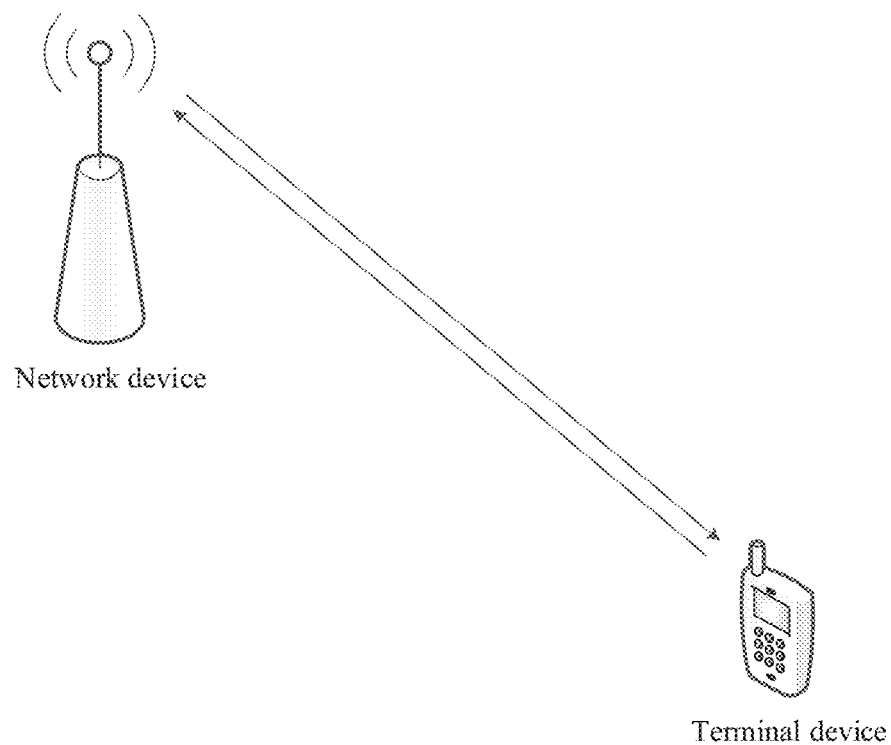
FIG. 4 is a schematic diagram of an application scenario according to an embodiment of this application.

The following describes a network architecture to which an embodiment of this application is applied. Refer to FIG. 4.

FIG. 4 includes a network device and a terminal device, and the terminal device is connected to the network device. Certainly, a quantity of terminal devices in FIG. 4 is merely an example. During actual application, the network device may provide services for a plurality of terminal devices. Some terminal devices in the plurality of terminal devices or each of all the terminal devices can perform cell reselection or measurement by using the solutions provided in the embodiments of this application. In addition, a mobile phone is used as an example of the terminal device in FIG. 4. This is not limited in actual application.

The network device in FIG. 4 is, for example, an access network device such as a base station. The access network device corresponds to different devices in different systems. For example, the access network device may correspond to an eNB in the 4th generation (4th generation, 4G) system, and correspond to a 5G access network device, for example, a gNB, in the 5G system. Certainly, the technical solutions provided in the embodiments of this application may also be applied to a future mobile communications system. Therefore, the network device in FIG. 4 may also correspond to an access network device in the future mobile communications system.

The following describes, with reference to the accompanying drawings, the technical solutions provided in the embodiments of this application.

Figure 5:
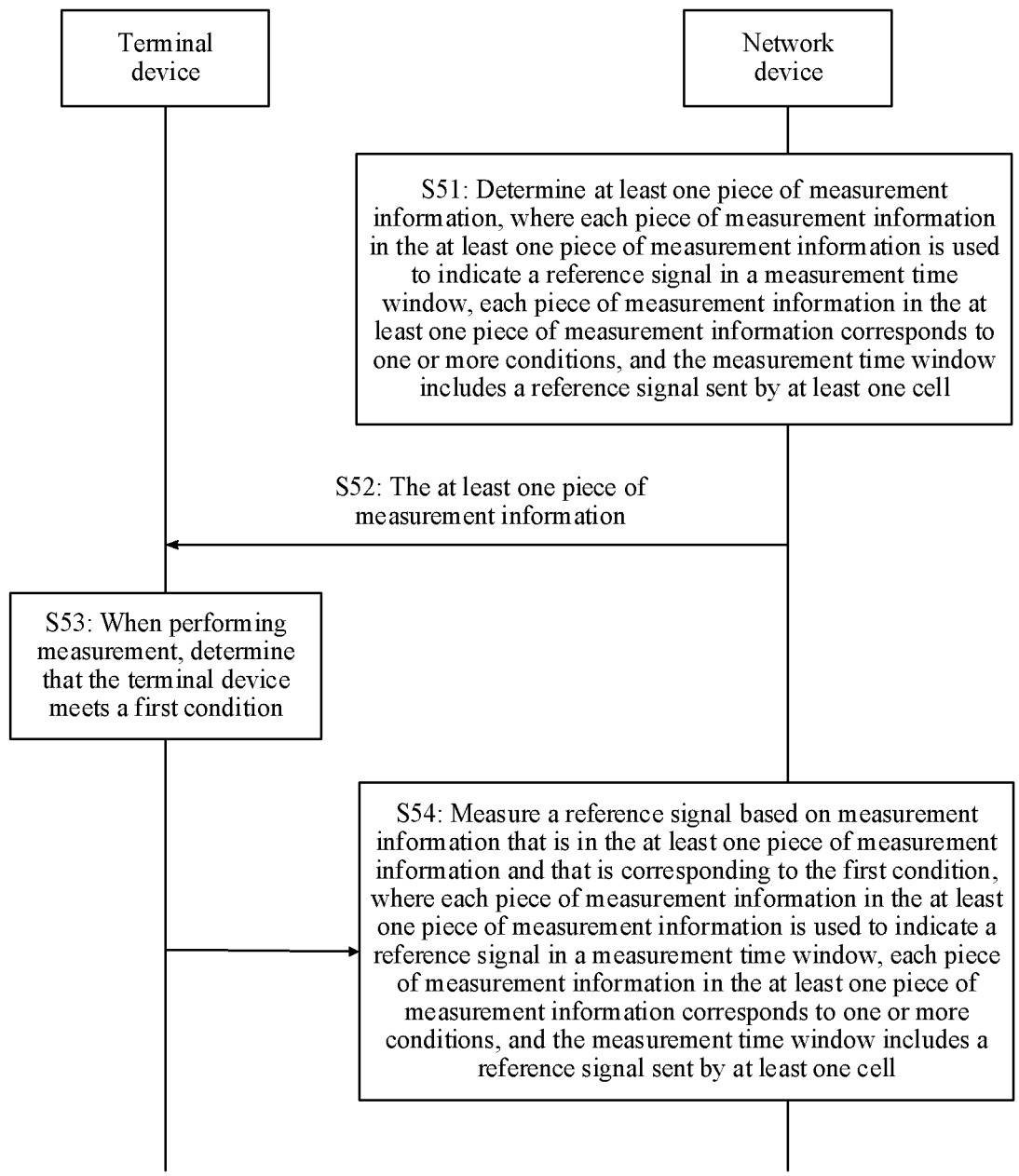
FIG. 5 is a flowchart of a reference signal measurement method according to an embodiment of this application.

An embodiment of this application provides a reference signal measurement method. FIG. 5 is a flowchart of the method. In the following description process, an example in which the method is used in the network architecture shown in FIG. 4 is used. In addition, the method may be performed by two communications apparatuses. The two communications apparatuses are, for example, a first communications apparatus and a second communications apparatus. The first communications apparatus may be a network device or a communications apparatus that can support a network device in implementing a function required for the method, or the first communications apparatus may be a terminal device or a communications apparatus that can support a terminal device in implementing a function required for the method. Certainly, the first communications apparatus may alternatively be another communications apparatus, for example, a chip system. Similarly, the second communications apparatus may be a network device or a communications apparatus that can support a network device in implementing a function required for the method, or the second communications apparatus may be a terminal device or a communications apparatus that can support a terminal device in implementing a function required for the method. Certainly, the second communications apparatus may alternatively be another communications apparatus, for example, a chip system. In addition, implementations of the first communications apparatus and the second communications apparatus are not limited. For example, the first communications apparatus may be a network device, and the second communications apparatus is a terminal device; or both the first communications apparatus and the second communications apparatus are network devices; or both the first communications apparatus and the second communications apparatus are terminal devices; or the first communications apparatus is a network device, and the second communications apparatus is a communications apparatus that can support a terminal device in implementing a function required for the method. For example, the network device is a base station.

For ease of description, the following uses an example in which the method is performed by a network device and a terminal device, that is, an example in which the first communications apparatus is a network device and the second communications apparatus is a terminal device. An example in which this embodiment is applied to the network architecture shown in FIG. 4 is used. Therefore, a network device described below may be the network device in the network architecture shown in FIG. 4, and a terminal device described below may be the terminal device in the network architecture shown in FIG. 4.

S51: The network device determines at least one piece of measurement information, where each piece of measurement information in the at least one piece of measurement information is used to indicate information about a to-be-measured reference signal, and each piece of measurement information in the at least one piece of measurement information corresponds to one or more conditions.

The reference signal is, for example, an SSB, or may be a channel state information-reference signal (channel state information-reference signal, CSI-RS), or certainly may be another reference signal.

For example, there may be a concept of measurement time window. The measurement time window may include a reference signal sent by at least one cell. Each piece of measurement information in the at least one piece of measurement information may be used to indicate information about a reference signal in the measurement time window. The measurement time window is, for example, an SMTC, or may be another type of time window used for measurement. For example, if the reference signal is an SSB, the measurement time window may exist, and an existence form is, for example, an SMTC. Certainly, if the reference signal is an SSB, the concept of measurement time window may not exist.

Alternatively, there may be no concept of measurement time window. For example, if the reference signal is a CSI-RS, there may be no measurement time window. Certainly, if the reference signal is a CSI-RS, the concept of measurement time window may also exist, and the measurement time window may also be implemented in a form of, for example, an SMTC, or may be implemented in another form.

In this embodiment of this application, the at least one piece of measurement information may correspond to at least one frequency, and the at least one frequency may include one frequency or a plurality of frequencies. In addition, the at least one piece of measurement information and the at least one frequency may be in a one-to-one correspondence, or may not be in a one-to-one correspondence. For example, one frequency may be corresponding to one or more pieces of measurement information. If the concept of measurement time window exists, it may also be understood that a measurement time window corresponds to at least one frequency. That a measurement time window corresponds to at least one frequency may be understood as: The measurement time window includes, in time domain, a reference signal sent by a cell at at least one frequency. That the at least one piece of measurement information may correspond to at least one frequency may be understood as: The at least one piece of measurement information is used to indicate information about a reference signal sent by a cell at at least one frequency.

For example, if the reference signal is an SSB, and the concept of measurement time window exists, the at least one frequency corresponding to the measurement time window may be one frequency, and at least one cell sends an SSB at the frequency. Certainly, when the reference signal is an SSB, the network device probably needs to determine measurement information corresponding to a plurality of frequencies. However, manners of determining measurement information for the plurality of frequencies by the network device are similar. Therefore, in this embodiment of this application, only an example in which the network device determines measurement information corresponding to one frequency is used.

Alternatively, the reference signal is a CSI-RS, and the concept of measurement time window does not exist. When the reference signal is a CSI-RS, the network device may configure a reference frequency, and may further configure one or more frequency offsets based on the reference frequency. At the reference frequency, CSI-RSs sent by one or more cells need to be measured, and each frequency offset is a frequency offset relative to the reference frequency. Therefore, one frequency may be determined based on one frequency offset and one reference frequency. That is, the network device may further configure one or more frequencies based on the reference frequency, and CSI-RSs sent by one or more cells at each of the one or more frequencies also need to be measured. If the network device configures only the reference frequency, but does not configure one or more frequencies based on the reference frequency, the at least one frequency corresponding to the at least one piece of measurement information may be one frequency, and at least one cell sends a CSI-RS at the frequency. Alternatively, if the network device configures the reference frequency and configures one or more frequencies based on the reference frequency, the at least one frequency corresponding to the at least one piece of measurement information may be a plurality of frequencies, and at least one cell sends CSI-RSs at the plurality of frequencies. Certainly, the plurality of frequencies are different from each other. In addition, the at least one cell sends CSI-RSs at the plurality of frequencies. The cell and the frequency may be in a one-to-one correspondence, or may not be in a one-to-one correspondence. For example, a quantity of the plurality of frequencies may be less than or equal to a quantity of the at least one cell, and one or more cells may transmit CSI-RSs at one frequency. Certainly, when the reference signal is a CSI-RS, the network device probably needs to determine measurement information corresponding to a plurality of reference frequencies (the network device may configure corresponding frequency offsets for some or all of the reference frequencies). However, manners of determining the measurement information for the plurality of reference frequencies by the network device are similar. Therefore, in this embodiment of this application, only an example in which the network device determines measurement information corresponding to one reference frequency (or a reference frequency and a corresponding frequency offset) is used.

For some terminal devices that meet a specific condition, for example, a terminal device moving on a city loop, an expressway, or other relatively fixed routes, reselection or handover is generally performed only between cells distributed along the special route. As can be seen, a quantity of cells for reselection or handover may not be large. For example, if the reference signal is an SSB, an SMTC includes, in time domain, reference signals sent by all cells at at least one frequency, and regardless of whether the terminal device is located on a special route, all the reference signals included in the SMTC need to be measured. However, for a terminal device on a special route, the terminal device is not to select, reselect, or be handed over to cells corresponding to some reference signals in the reference signals included in the SMTC. Therefore, measurement of these reference signals is probably invalid, but increases power consumption of the terminal device and wastes measurement time.

In view of this, in the embodiment of this application, an association relationship is established between measurement information and a condition. For example, each piece of measurement information in the at least one piece of measurement information determined by the network device corresponds to one or more conditions. Subsequently, a terminal device that meets a specific condition only needs to perform measurement based on measurement information corresponding to the met condition, and does not need to measure a large quantity of cells. This helps reduce power consumption of the terminal device.

In the embodiment of this application, a first condition may include: A path on which the terminal device is located is a first path; or a path on which the terminal device is located is a first path, and a speed of the terminal device meets a first speed condition; or the terminal device meets a third speed condition; or a received signal of the terminal device meets a first threshold condition; or a path on which the terminal device is located is a first path, and a received signal of the terminal device meets a first threshold condition. In other words, the first condition may be only a path condition, or a path condition and a speed condition, or only a speed condition, or only a received signal condition, or a path condition and a received signal condition. The path on which the terminal device is located may be a movement path of the terminal device, or referred to as a motion path of the terminal device. In other words, the first path is a movement path.

Figure 6:
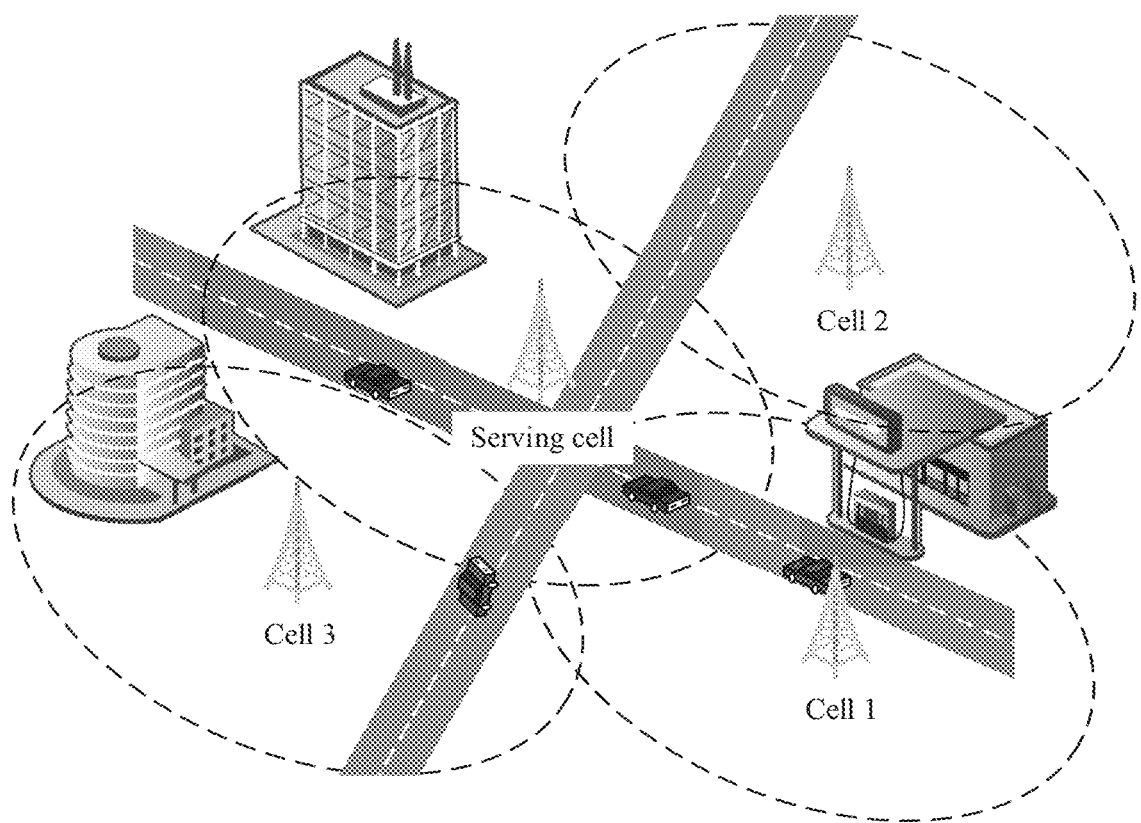
FIG. 6 is a schematic diagram of a first path according to an embodiment of this application.

For example, there are a large quantity of users in vehicles on a relatively fixed route such as a city loop, a high-speed railway, or an expressway. To reduce power consumption caused by measurement performed by terminal devices used by these users, for example, for a to-be-measured frequency and the first condition, the network device may determine one or more pieces of measurement information. Some or all of the one or more pieces of measurement information may be used by a terminal device that meets the first condition to perform cell reselection, handover, or measurement. The one or more pieces of measurement information are determined by the network device, for example, may be determined by the network device based on the first condition. For example, each piece of measurement information in the one or more pieces of measurement information is information used to determine a reference signal sent by a corresponding cell. For example, the first condition includes that the path on which the terminal device is located is the first path. In this case, the corresponding cell may be a cell located on the first path. For example, FIG. 6 includes two intersecting paths, and either of the two paths may be used as the first path. Different paths may include different directions and/or different coverage areas. Specifically, different paths may include different directions or different coverage areas, or include different directions and different coverage areas. It can be seen that the two paths in FIG. 6 have different directions, and areas covered by the two paths are not completely the same. For example, if the lateral path shown in FIG. 6 is used as the first path, the one or more pieces of measurement information determined by the network device may include information about reference signals sent by the cell 1 and the serving cell in FIG. 6. For a terminal device that meets the first condition, a measurement range for cell reselection, handover, or measurement is reduced, so that the terminal device can perform cell reselection, handover, or measurement in a more targeted manner, and power consumption of the terminal device can be reduced because a quantity of reference signals that need to be measured is reduced.

As described above, the first condition may include that the path on which the terminal device is located is the first path, or the first condition may include that the path on which the terminal device is located is the first path, and the speed of the terminal device meets the first speed condition. In other words, the first condition may be only a path condition, or a path condition and a speed condition. The following describes how the terminal device is considered to meet the first condition.

1. The first condition includes that the path on which the terminal device is located is the first path.

In this case, there may also be different manners for determining whether the terminal device meets the first condition.

In the first case, in a first implementation of determining whether the terminal device meets the first condition, when the speed of the terminal device meets a second speed condition, it is determined that the path on which the terminal device is located is the first path. In this manner, the path is directly determined by using the speed. The speed of the terminal device usually can be learned by the terminal device itself. Therefore, it is clearly that this determining manner is relatively simple. The second speed condition may be notified by the network device to the terminal device in advance, or may be specified in a protocol.

For example, the second speed condition is a speed threshold, and the speed threshold is corresponding to a traveling speed of the terminal device. For example, the speed threshold is 200 km/hour. In other words, the second speed condition is that the speed of the terminal device is greater than or equal to 200 km/hour. In this case, if the speed of the terminal device is greater than 200 km/hour, it can be determined that the terminal device meets the second speed condition, that is, it can be determined that the terminal device meets the first condition. The second speed condition may be a speed threshold, for example, it is specified that the speed of the terminal device needs to be greater than or equal to the speed threshold. Alternatively, the second speed condition may be a speed range, for example, it is specified that the speed of the terminal device needs to fall within the speed range. An implementation form of the second speed condition is not limited.

Figure 7:
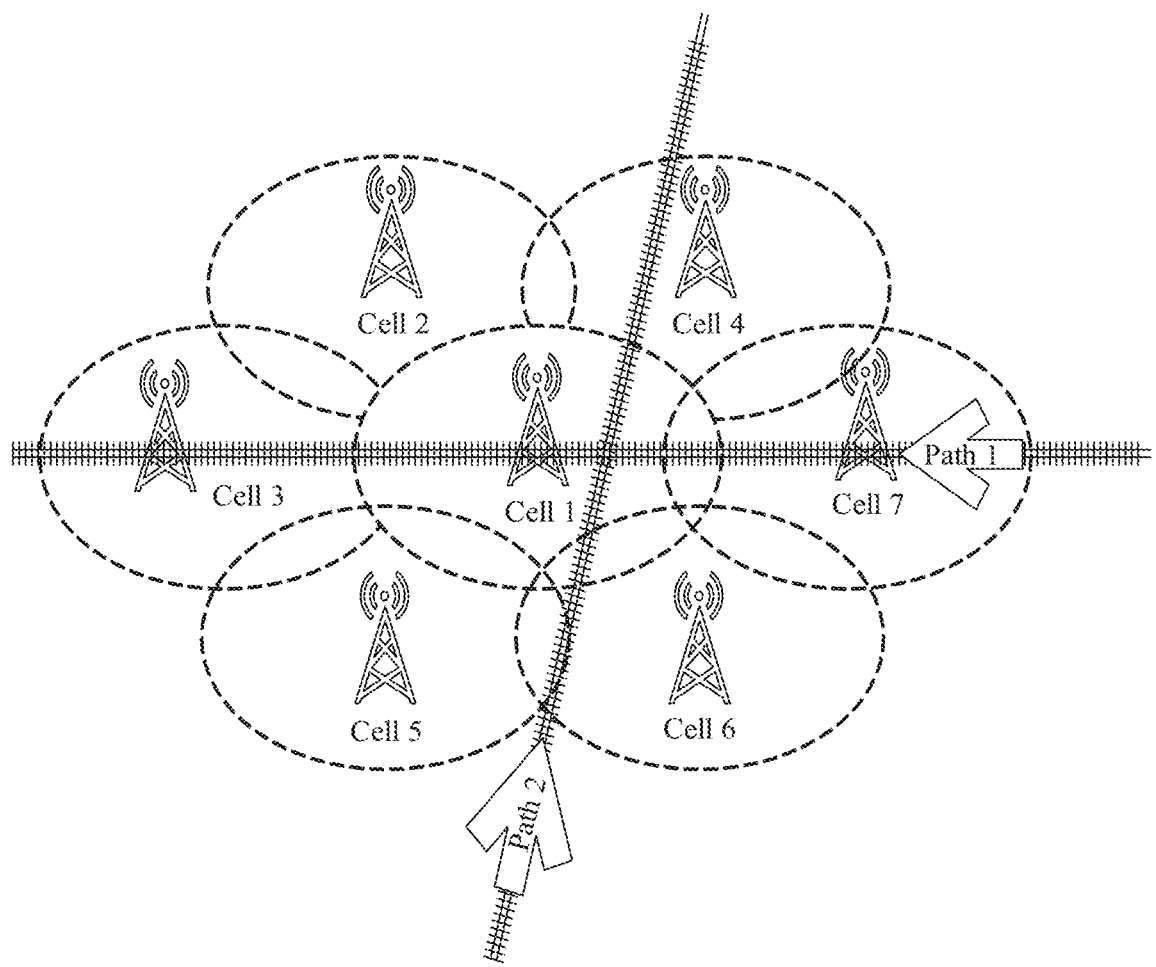
FIG. 7 is a schematic diagram of determining a path based on a speed according to an embodiment of this application.

For example, FIG. 7 includes two paths: a path 1 and a path 2. The path 1 and the path 2 may correspond to different speed conditions. For example, the path 1 is a path of a high-speed railway, and usually a speed of a terminal device located on the high-speed railway may be 200 km/hour. The path 2 is a path of an expressway, and a speed of a terminal device traveling on the expressway is probably greater than or equal to 60 km/hour, or a speed of a terminal device traveling on the expressway may be considered to be greater than or equal to 60 km/hour and less than 200 km/hour. In this case, if the second speed condition included in the first condition is that the speed of the terminal device is greater than or equal to 200 km/hour, the terminal device on the high-speed railway may meet the first condition.

Alternatively, for example, the second speed condition is a speed threshold, and the speed threshold is corresponding to a channel change speed of the terminal device. In other words, the second speed condition is that the channel change speed of the terminal device is greater than or equal to the speed threshold. In this case, if the channel change speed of the terminal device is greater than the speed threshold, it can be determined that the terminal device meets the second speed condition, that is, it can be determined that the terminal device meets the first condition. The second speed condition may be a speed threshold, for example, it is specified that the channel change speed of the terminal device needs to be greater than or equal to the speed threshold. Alternatively, the second speed condition may be a speed range, for example, it is specified that the channel change speed of the terminal device needs to fall within the speed range. An implementation form of the second speed condition is not limited.

Alternatively, for example, the second speed condition is a change threshold, and the change threshold is corresponding to a quantity of cells that are reselected by the terminal device or to which the terminal device is handed over within first duration. In other words, the second speed condition is that the quantity of cells that are reselected by the terminal device or to which the terminal device is handed over within the first duration is greater than or equal to the change threshold. In this case, if the quantity of cells that are reselected by the terminal device or to which the terminal device is handed over within the first duration is greater than the change threshold, it can be determined that the terminal device meets the second speed condition, that is, it can be determined that the terminal device meets the first condition.

The second speed condition may be a change threshold. For example, it is specified that the quantity of cells that are reselected by the terminal device or to which the terminal device is handed over within the first duration needs to be greater than or equal to the change threshold. Alternatively, it is specified that a quantity of changes of beams serving the terminal device in a current serving cell or camped-on cell within the first duration needs to be greater than or equal to the change threshold. Alternatively, the second speed condition may be a change interval. For example, it is specified that the quantity of cells that are reselected by the terminal device or to which the terminal device is handed over within the first duration needs to fall within the change interval. Alternatively, it is specified that the quantity of changes of beams serving the terminal device in the current serving cell or camped-on cell within the first duration needs to fall within the change interval. For example, in the first duration, if an index (index) of a beam serving the terminal device in the current serving cell or camped-on cell of the terminal device changes from index 1 to index 2, and then to index 3, a quantity of beam changes is 3. If the change threshold is set to 2, the terminal device meets the second speed condition. For another example, in the first duration, an index of a beam serving the terminal device in the current serving cell or camped-on cell of the terminal device changes from index 1 to index 2, and then to index 3, a quantity of beam changes is 3. If the change interval is set to [1, 3], the terminal device meets the second speed condition. The foregoing is merely an example. An implementation form of the second speed condition is not limited. The first duration may be configured by the network device, or may be specified in a protocol, or the like. The second speed condition and the first speed condition may be a same condition, or may be different conditions. A relationship between the two speed conditions is not limited. The second speed condition may be notified by the network device to the terminal device in advance, or may be specified in a protocol.

In the first case, in a second implementation of determining whether the terminal device meets the first condition, whether the terminal device is located on the first path is determined based on a motion path of the terminal device.

For example, the terminal device may perform positioning in a moving process. For example, the terminal device may perform positioning in a manner such as using a global positioning system (global positioning system, GPS). In this case, the terminal device may determine the motion path of the terminal device based on historical positioning information. If the terminal device determines that the motion path is consistent with the first path, it can be determined that the terminal device is located on the first path.

In the first case, in a third implementation of determining whether the terminal device meets the first condition, whether the terminal device is located on the first path is determined based on historical information of cell handover or cell reselection performed by the terminal device.

Figure 8:
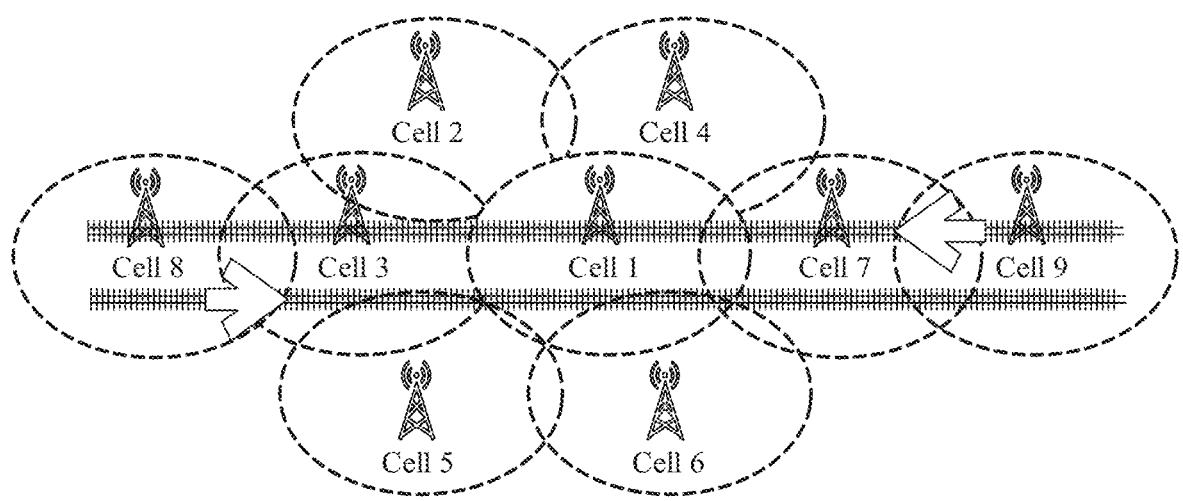
FIG. 8 is a schematic diagram in which a terminal device determines, based on a cell to be handed over or reselected, whether a first condition is met according to an embodiment of this application.

Refer to FIG. 8. For example, two arrows in FIG. 8 represent two paths. For example, a path indicated by an arrow pointing to the right is the path 1, and a path indicated by an arrow pointing to the left is the path 2. For example, if the terminal device determines, based on the historical information of cell handover or cell reselection performed by the terminal device, that the terminal device is handed over from the cell 9 to the cell 7, the terminal device may determine that the path on which the terminal device is located is a path from the cell 9 to the cell 7, that is, the path 2. Alternatively, if the terminal device determines, based on the historical information of cell handover performed by the terminal device, that the terminal device is handed over from the cell 3 to the cell 1, the terminal device may determine that the path on which the terminal device is located is a path from the cell 3 to the cell 1, that is, the path 1. Alternatively, the terminal device determines path information based on a historical information record of a serving beam change of the terminal device in the current serving cell or camped-on cell. For example, in the current serving cell or camped-on cell of the terminal device, a change order of indexes of beams serving the terminal device is 1→2→3, which indicates that the path on which the terminal device is located is a path from the beam 1 to the beam 3, for example, the path 1.

2. The first condition includes that the path on which the terminal device is located is the first path, and the speed of the terminal device meets the first speed condition.

In this case, whether the terminal device is located on the first path and whether the speed of the terminal device meets the first speed condition both need to be determined. When the terminal device is located on the first path and the speed meets the first speed condition, it can be determined that the terminal device meets the first condition.

For a determining manner of determining whether the terminal device is located on the first path, refer to the foregoing related descriptions.

For a determining manner of determining whether the speed of the terminal device meets the first speed condition, refer to the foregoing description of determining whether the terminal device meets the second speed condition. The first speed condition and the second speed condition may be different conditions. For example, the first speed condition is a change threshold, and the second speed condition is a speed threshold. Alternatively, the first speed condition and the second speed condition may be a same condition. For example, both the first speed condition and the second speed condition are speed thresholds, and the speed threshold corresponding to the first speed condition is the same as the speed threshold corresponding to the second speed condition.

3. The first condition includes that the speed of the terminal device meets the third speed condition.

In this case, whether the terminal device meets the first condition may be directly determined by using the speed. The speed of the terminal device usually can be learned by the terminal device itself. Therefore, this determining manner is relatively simple.

For a determining manner of determining whether the speed of the terminal device meets the third speed condition, refer to the foregoing description of determining whether the terminal device meets the second speed condition.

The first speed condition, the second speed condition, and the third speed condition may be a same condition, or may be different conditions, or any two of the first speed condition, the second speed condition, and the third speed condition are a same condition, and a remaining speed condition is a different condition. The third speed condition may be notified by the network device to the terminal device in advance, or may be specified in a protocol.

In this case, it may be considered that the first condition is path-independent. For example, a terminal device that meets the third speed condition is a high-speed terminal device. Alternatively, it may be considered that in this manner, a path is determined by using a speed, and setting the first condition as the speed condition actually indicates that the terminal device is located on a corresponding path. For example, a speed corresponding to a path of a high-speed railway is different from a speed corresponding to a path of a highway. In this case, different paths can be distinguished by setting a speed condition.

4. The first condition includes that the received signal of the terminal device meets the first threshold condition. Alternatively, it may be understood that the first condition includes that a receive channel of the terminal device meets the first threshold condition. The receive channel may be a channel carrying a received signal.

The first threshold condition is, for example, a channel change threshold. For example, if a change amplitude of quality of signals received by the terminal device in a first time window or in second duration is greater than the channel change threshold, it can be determined that the received signal of the terminal device meets the first threshold condition. Alternatively, if a change amplitude of quality of receive channels of the terminal device in a first time window or in second duration is greater than the channel change threshold, it can be determined that the received signal of the terminal device meets the first threshold condition. The first time window or the second duration may be configured by the network device or specified in a protocol.

Alternatively, the first threshold condition is a threshold for a difference between highest received signal quality and lowest received signal quality, or is described as a threshold for a difference between highest receive channel quality and lowest receive channel quality.

The highest receive channel quality (or the highest received signal quality) is highest quality of a receive channel (or a received signal) in a second time window or third duration. The lowest receive channel quality (or the lowest received signal quality) is lowest quality of a receive channel (or a received signal) in the second time window or the third duration. The second time window or the third duration may be configured by the network device or specified in a protocol. If quality of a current receive channel (or received signal) of the terminal device is higher than the highest receive channel quality (or the highest received signal quality) or when the terminal device performs cell reselection, a value of the quality of the current receive channel may be updated to a value of the highest receive channel quality (or the highest received signal quality). Alternatively, if quality of a current receive channel (or received signal) of the terminal device is lower than the lowest receive channel quality (or the lowest received signal quality) or when the terminal device performs cell reselection, a value of the quality of the current receive channel (or received signal) may be updated to a value of the lowest receive channel quality (or the lowest received signal quality).

Alternatively, the first threshold condition is a threshold for a difference between reference signal quality and current received signal quality, or is described as a threshold for a difference between reference channel quality and current receive channel quality. The reference channel quality (or the reference signal quality) may be set in the following manner: If the current receive channel quality of the terminal device is higher than the reference channel quality, or the terminal device performs cell reselection, or a difference between the reference channel quality and the current receive channel quality of the terminal device in the third duration is less than a threshold, a value of the current receive channel quality of the terminal device is set to a value of the reference channel quality. The third duration may be configured by the network device or specified in a protocol.

Parameters used to measure signal quality (or channel quality) include but are not limited to at least one of reference signal received power (reference signal received power, RSRP), reference signal received quality (reference signal received quality, RSRQ), or a signal to interference plus noise ratio (signal to interference plus noise ratio, SINR). For example, the parameters used to measure signal quality (or channel quality) include RSRP, or include RSRQ, or include an SINR, or include RSRP and RSRQ, or include RSRP and an SINR, or include RSRQ and an SINR, or include RSRQ, RSRQ, and an SINR.

5. The first condition includes that the path on which the terminal device is located is the first path, and the received signal of the terminal device meets the first threshold condition. Alternatively, the first condition includes that the path on which the terminal device is located is the first path, and a receive channel of the terminal device meets the first threshold condition.

For how to determine whether the path on which the terminal device is located is the first path, and how to determine whether the received signal (or the receive channel) of the terminal device meets the first threshold condition, refer to the foregoing descriptions.

In addition, the first threshold condition and a second threshold condition may be different conditions. For example, the first threshold condition is a channel change threshold, and the second threshold condition is a threshold for a difference between highest received signal quality and lowest received signal quality. Alternatively, for example, both the first threshold condition and the second threshold condition are channel change thresholds, but a value of a channel change threshold used as the first threshold condition is different from a value of a channel change threshold used as the second threshold condition. Alternatively, the first threshold condition and the second threshold condition may be a same condition. For example, both the first threshold condition and the second threshold condition are thresholds for a difference between reference signal quality and current received signal quality. In addition, a value of a threshold used as the first threshold condition is the same as a value of a threshold used as the second threshold condition.

The foregoing describes a plurality of implementations of the first condition. Specific content of the first condition may be specified in a protocol, or may be preconfigured by the network device. For example, the network device may send a first message to the terminal device, and the first message is used to indicate the first condition. After receiving the first message, the terminal device may learn of the specific first condition. For example, if the first message is a broadcast message or a multicast message, the network device may notify a plurality of terminal devices of the first condition at a time, and does not need to send a large amount of information, thereby saving transmission resources. Alternatively, the first message may be a unicast message, and the network device may notify the terminal device of the first condition in a targeted manner, so that the notification is more accurate. In addition, if the first condition is the condition described in the foregoing first case, that is, the first condition includes that the path on which the terminal device is located is the first path, a specific manner used by the terminal device to determine whether the terminal device meets the first condition, for example, a manner of using only a speed or a manner of using path information, may be specified in a protocol, or may be determined by the network device, or may be determined by the terminal device.

The foregoing describes related content of the first condition, and the following describes measurement information in the embodiment of this application. In the embodiment of this application, the network device may determine the measurement information, for example, generate the measurement information. The measurement information may be implemented in different manners.

a. A first implementation of measurement information: One piece of measurement information in the at least one piece of measurement information is information about a synchronization signal block to measure (SSB to measure).

In this manner, an example in which the reference signal is an SSB is mainly used.

In the at least one piece of measurement information, only one or more pieces of measurement information may be SSBs to measure, and remaining measurement information in the at least one piece of measurement information may be implemented in another form. Alternatively, each piece of measurement information in all of the at least one piece of measurement information may be an SSB to measure.

For example, if a measurement time window exists, for the measurement time window, an SSB to measure may be used to indicate an SSB that needs to be measured in the measurement time window, that is, may be used to indicate information about an SSB that needs to be measured in the measurement time window. For example, an SSB to measure may indicate time domain locations of some SSBs in the measurement time window, or may be used to indicate indexes of some SSBs in the measurement time window, or the like. For example, an SSB to measure may be in a form of a bitmap (bitmap), bits included in the bitmap are in a one-to-one correspondence with indexes of all SSBs included in the measurement time window, and the bitmap is used to indicate an index corresponding to an SSB that needs to be measured. For example, if a measurement time window includes four SSBs, that is, includes four indexes, one SSB to measure may include four bits (bit), where one bit corresponds to one index. If a value of a bit is "1", it indicates that an SSB indicated by an index corresponding to the bit needs to be measured; if a value of a bit is "0", it indicates that an SSB indicated by an index corresponding to the bit does not need to be measured. An indication granularity of a time domain location that needs to be measured can be further refined by using the SSB to measure, so that measurement by the terminal device is more targeted, and power consumption of the terminal device is reduced.

For example, each piece of measurement information in all of the at least one piece of measurement information is an SSB to measure. In the embodiment of this application, at least one SSB to measure may be configured for one measurement time window, different SSBs to measure may indicate different indexes (indexes of SSBs), a correspondence may be established between each SSB to measure and a corresponding condition, and one SSB to measure may correspond to one or more conditions. In this case, a terminal device that meets the first condition needs to measure only an SSB indicated by an SSB to measure corresponding to the first condition, and does not need to measure another SSB included in the measurement time window. In this way, power consumption of the terminal device caused by measurement is reduced.

The measurement information is implemented by using an SSB to measure, and the measurement time window may directly multiplex an existing SMTC in the conventional technology. This helps make the technical solutions provided in the embodiment of this application compatible with an existing protocol.

b. A second implementation of measurement information: One piece of measurement information in the at least one piece of measurement information is an SMTC.

In the at least one piece of measurement information, only one or more pieces of measurement information may be SMTCs, and remaining measurement information in the at least one piece of measurement information may be implemented in another form. For example, the at least one piece of measurement information further includes an SSB to measure. Alternatively, each piece of measurement information in all of the at least one piece of measurement information may be an SMTC.

For example, if the concept of measurement time window exists, the measurement time window may still multiplex an existing SMTC in the conventional technology. For example, the reference signal is an SSB. The SMTC includes SSBs sent by a plurality of cells at one frequency. However, in addition to the measurement time window, the network device may further configure one or more SMTCs, and reference signals included in each additionally configured SMTC is a subset of reference signals included in the measurement time window. That one SMTC is a subset of another SMTC, for example, a first SMTC is a subset of a second SMTC may include: A length of the first SMTC is less than or equal to a length of the second SMTC; or a periodicity of the first SMTC is greater than a periodicity of the second SMTC; or a length of the first SMTC is less than or equal to a length of the second SMTC, and a periodicity of the first SMTC is greater than a periodicity of the second SMTC. For example, a periodicity of an SMTC used to indicate the measurement time window is 20 ms, and a length of the SMTC is 5 ms; a periodicity of an additionally configured SMTC corresponding to the first condition is 20 ms, and a length of the additionally configured SMTC is 2 ms. Alternatively, a periodicity of an additionally configured SMTC corresponding to the first condition is, for example, 160 ms, and a length of the additionally configured SMTC is, for example, 5 ms. Alternatively, a periodicity of an additionally configured SMTC corresponding to the first condition is, for example, 160 ms, and a length of the additionally configured SMTC is, for example, 2 ms.

Figure 9A:
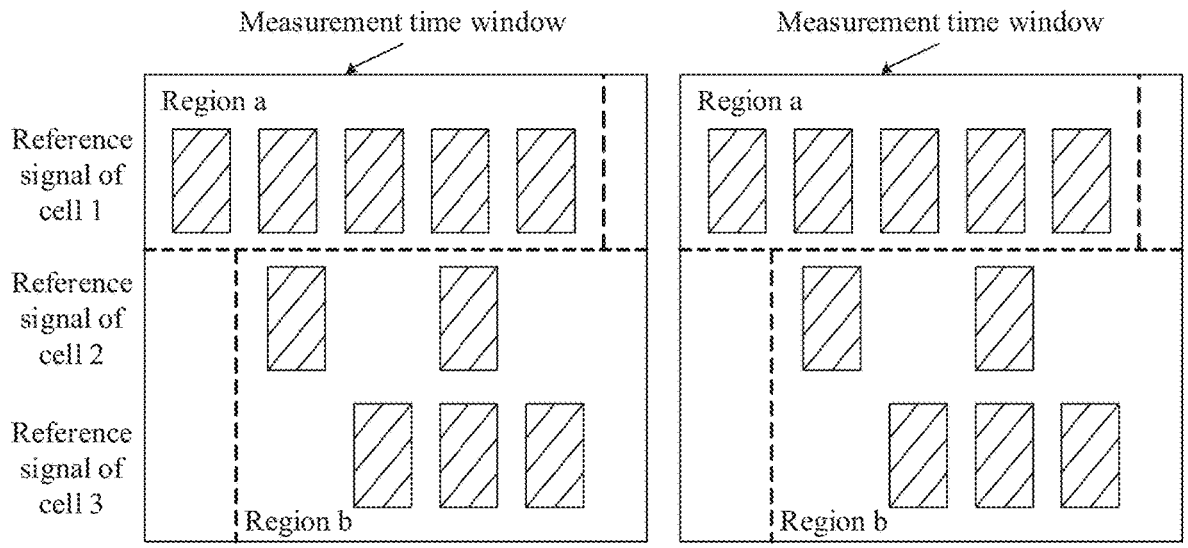
FIG. 9A is a schematic diagram in which a network device additionally configures an SMTC provided in an embodiment of this application in addition to an original SMTC according to an embodiment of this application.

For example, the network device establishes a correspondence between the first condition and an SMTC 1, and establishes a correspondence between a second condition and an SMTC 2. For the first condition, the terminal device needs to measure only a reference signal sent by a cell 1, and for the second condition, the terminal device needs to measure only reference signals sent by a cell 2 and a cell 3. Refer to FIG. 9A. The measurement time window includes reference signals sent by the cell 1, the cell 2, and the cell 3. In this case, the SMTC 1 configured by the network device includes a part shown in region a in FIG. 9A. It can be learned that the SMTC 1 needs to include reference signals sent by the cell 1, and does not involve reference signals sent by the cell 2 and the cell 3. The SMTC 2 configured by the network device includes a part shown in region b in FIG. 9A. It can be learned that the SMTC 1 needs to include the reference signals sent by the cell 2 and the cell 3, does not involve the reference signals sent by the cell 1. In addition, because the measurement time window may have a periodicity, two measurement time windows are shown in FIG. 9A, that is, two SMTCs 1 and two SMTCs 2 are correspondingly included.

Figure 9B:
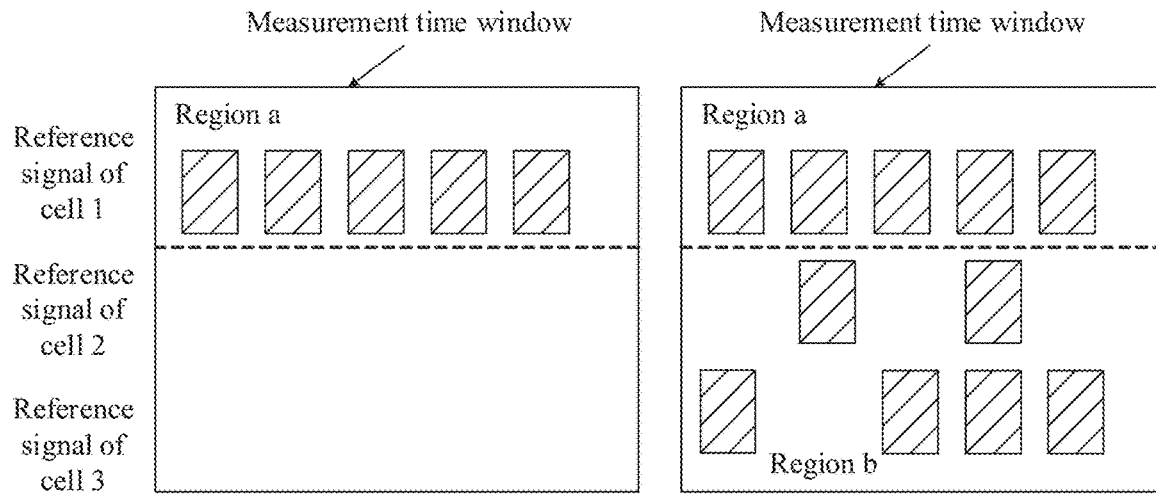
FIG. 9B is another schematic diagram in which a network device additionally configures an SMTC provided in an embodiment of this application in addition to an original SMTC according to an embodiment of this application.

For another example, the network device establishes a correspondence between the first condition and an SMTC 1, and establishes a correspondence between a second condition and an SMTC 2. For the first condition, the terminal device needs to measure only a reference signal sent by a cell 1, and for the second condition, the terminal device needs to measure only reference signals sent by a cell 2 and a cell 3. Refer to FIG. 9B. The measurement time windows include reference signals sent by the cell 1, the cell 2, and the cell 3. In this case, the SMTC 1 configured by the network device includes a part shown in region a in FIG. 9B. It can be learned that the SMTC 1 needs to include reference signals sent by the cell 1, and does not involve reference signals sent by the cell 2 and the cell 3. The SMTC 2 configured by the network device includes a part shown in region b in FIG. 9B, and a periodicity in region b is greater than a periodicity in region a. It can be learned that the SMTC 1 needs to include the reference signals sent by the cell 2 and the cell 3, does not involve the reference signals sent by the cell 1.

In this manner of additionally setting an SMTC, the terminal device needs to measure only a reference signal corresponding to a specific condition, and does not need to measure another reference signal included in the measurement time window. Therefore, measurement time is reduced, and power consumption of the terminal device is reduced.

c. A third implementation of measurement information: One piece of measurement information in the at least one piece of measurement information is a measurement timing configuration, where the measurement timing configuration indicates a time window used to measure a CSI-RS.

In the at least one piece of measurement information, only one or more pieces of measurement information may be measurement timing configurations, and remaining measurement information in the at least one piece of measurement information may be implemented in another form. For example, the at least one piece of measurement information further includes an SMTC or the like. Alternatively, each piece of measurement information in all of the at least one piece of measurement information may be a measurement timing configuration.

In this implementation, an example in which the reference signal is a CSI-RS is mainly used. The network device may configure one or more measurement timing configurations, and each measurement timing configuration in the configured measurement timing configurations may include CSI-RSs sent by one or more cells. A terminal device that meets a specific condition only needs to perform measurement based on a measurement timing configuration corresponding to the condition, and does not need to measure a CSI-RS sent by another cell.

d. A fourth implementation of measurement information: One piece of measurement information in the at least one piece of measurement information is a bitmap. Bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments.

In the at least one piece of measurement information, only one or more pieces of measurement information may be bitmaps, and remaining measurement information in the at least one piece of measurement information may be implemented in another form. For example, the at least one piece of measurement information further includes an SSB to measure, an SMTC, or the like. Alternatively, each piece of measurement information in all of the at least one piece of measurement information may be a bitmap.

For example, the measurement time window may be divided into at least two time segments, a quantity of time segments obtained through division is the same as a quantity of bits included in the bitmap, and one bit in the bitmap is used to indicate one time segment in the measurement time window. The measurement time window may be divided at equal intervals, and in this case, duration of different time segments may be the same. Alternatively, the measurement time window may be divided at unequal intervals, and in this case, duration of different time segments may be different. This is not specifically limited. Certainly, a larger quantity of time segments obtained through division indicates a finer granularity indicated by the measurement information.

For example, if the measurement time window is divided into four time segments, the bitmap may include four bits, and one bit is corresponding to one time segment. If a value of a bit is "1", it indicates that the bitmap indicates the time segment, and implicitly indicates that the terminal device may measure a reference signal included in the time segment, or implicitly indicates that the time segment is used by the terminal device to measure a reference signal included in the time segment. If a value of a bit is "0", it indicates that the bitmap does not indicate the time segment, and implicitly indicates that the terminal device does not need to measure a reference signal included in the time segment, or implicitly indicates that the time segment does not need to be used by the terminal device to measure a reference signal included in the time segment.

In addition, it should be noted that an implementation of an SSB to measure may also be a bitmap, but the bitmap used to implement the SSB to measure may indicate an index of an SSB, a time domain location of an SSB, or the like. However, the bitmap in the third implementation of the measurement information directly indicates a time segment in a measurement time window. The indication content is different.

An indication granularity of a time domain location that needs to be measured can be further refined by using the bitmap, so that measurement by the terminal device is more targeted, and power consumption of the terminal device is reduced.

e. A fifth implementation of measurement information: One piece of measurement information in the at least one piece of measurement information is a scaling factor (scaling factor). The scaling factor is used to indicate information about length adjustment of a measurement time window, or used to indicate information about periodicity adjustment of a measurement time window. A measurement time window obtained after adjustment based on the scaling factor is used by the terminal device to measure a reference signal included in the adjusted measurement time window.

In the at least one piece of measurement information, only one or more pieces of measurement information may be scaling factors, and remaining measurement information in the at least one piece of measurement information may be implemented in another form. For example, the at least one piece of measurement information further includes an SSB to measure, an SMTC, or the like. Alternatively, each piece of measurement information in all of the at least one piece of measurement information may be a scaling factor.

If a scaling factor is used to adjust a length of a measurement time window, an adjustment manner may be reducing the length of the measurement time window, or increasing the length of the measurement time window. For example, when an original length of a measurement time window is insufficient to include a required quantity of reference signals, the length of the measurement time window may be increased by using a scaling factor, so that more reference signals can be measured.

If a scaling factor is used to adjust a periodicity of a measurement time window, an adjustment manner may be reducing the periodicity of the measurement time window, or increasing the periodicity of the measurement time window. For example, when an original length of a measurement time window is insufficient to include a required quantity of reference signals, the periodicity of the measurement time window may be reduced by using a scaling factor, so that more reference signals can be measured.

When a measurement time window is being adjusted based on a scaling factor, a start moment of the measurement time window may be adjusted, an end moment of the measurement time window may be adjusted, or a start moment and an end moment of the measurement time window may be adjusted. A specific adjustment manner may be random, configured by the network device, specified by a protocol, or the like. In addition, a correspondence may be established between an adjustment manner and a condition. For example, for a condition 1, when a measurement time window is being adjusted based on a scaling factor, a start moment of the measurement time window is adjusted; for a condition 2, when a measurement time window is being adjusted based on a scaling factor, an end moment of the measurement time window is adjusted.

Figure 10A:
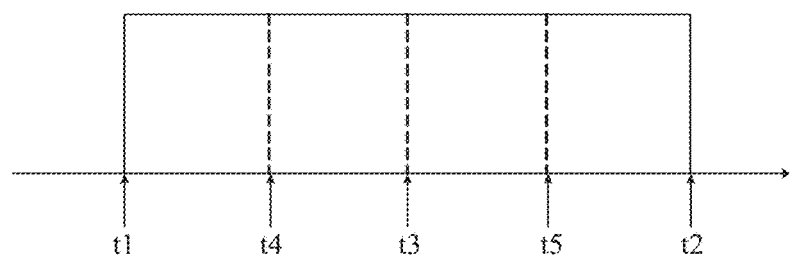
FIG. 10A is a schematic diagram of adjusting a measurement time window based on a scaling factor according to an embodiment of this application.

Refer to FIG. 10A. For example, t1 in FIG. 10A represents a start moment of a measurement time window, t2 represents an end moment of the measurement time window, and a difference between t2 and t1 represents a length of the measurement time window. For example, a value of a scaling factor is 50% or 0.5, which is used to indicate to adjust the length of the measurement time window to half of the original length. In this case, if the length of the measurement time window is adjusted by adjusting the start moment of the measurement time window, the start moment of the measurement time window may be adjusted from t1 to t3, where t3=(t2−t1)/2, and the end moment of the measurement time window is still t2. Alternatively, if the length of the measurement time window is adjusted by adjusting the end moment of the measurement time window, the end moment of the measurement time window may be adjusted from t2 to t3, where t3=(t2−t1)/2, and the start moment of the measurement time window is still t1. Alternatively, if the length of the measurement time window is adjusted by adjusting the start moment and the end moment of the measurement time window, the start moment of the measurement time window may be adjusted from t1 to t4, and the end moment of the measurement time window may be adjusted from t2 to t5.

f. A sixth implementation of measurement information: One piece of measurement information in the at least one piece of measurement information is offset information of a measurement time window.

This implementation is based on the concept of measurement time window. The offset information may be used to indicate information about length adjustment of a measurement time window, and a measurement time window obtained after adjustment based on the offset information is used by the terminal device to measure a reference signal included in the adjusted measurement time window.

Figure 10B:
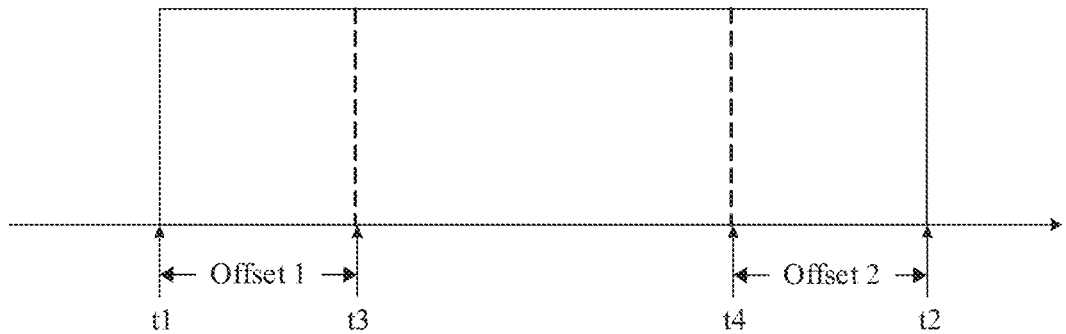
FIG. 10B is a schematic diagram of adjusting a measurement time window based on offset information according to an embodiment of this application.

When a measurement time window is being adjusted based on offset information, a start moment of the measurement time window may be adjusted, an end moment of the measurement time window may be adjusted, or a start moment and an end moment of the measurement time window may be adjusted. A specific moment to be adjusted may be random, configured by the network device, specified by a protocol, or the like. In addition, a correspondence may be established between an adjustment manner and a condition. For example, for a condition 1, when a measurement time window is being adjusted based on offset information, a start moment of the measurement time window is adjusted; for a condition 2, when a measurement time window is being adjusted based on offset information, an end moment of the measurement time window is adjusted. Refer to FIG. 10B. For example, t1 in FIG. 10B represents a start moment of a measurement time window, t2 represents an end moment of the measurement time window, and a difference between t2 and t1 represents a length of the measurement time window. For example, one piece of measurement information includes offset information 1 and offset information 2. The offset information 1 is corresponding to adjustment of the start moment of the time window, and the offset 2 is corresponding to adjustment of the end moment of the time window. In this case, a start moment of an adjusted measurement time window is t3, and an end moment is t4.

The foregoing implementations of measurement information are merely examples, and other implementations of measurement information are not limited in the embodiment of this application. For example, measurement information may be implemented by using indication information. The indication information indicates, for example, one or more time segments of a measurement time window. For example, one piece of indication information may be used to indicate the first 20% of time segments of the measurement time window. Alternatively, the indication information may indicate a start moment and an end moment of a time segment in a measurement time window, or the like.

S52: Send the at least one piece of measurement information to the terminal device, and the terminal device receives the at least one piece of measurement information from the network device, where the at least one piece of measurement information is used by the terminal device to measure a reference signal based on the at least one piece of measurement information.

After determining the at least one piece of measurement information, the network device may send the at least one piece of measurement information to the terminal device for measurement. For example, the network device may send the at least one piece of measurement information to the terminal device by using broadcast information, or may send the at least one piece of measurement information to the terminal device by using dedicated signaling. The broadcast information is, for example, a system message, for example, a SIB2, a SIB3, a SIB4, or an LTE SIB24, and the dedicated signaling is, for example, radio resource control (radio resource control, RRC) signaling.

For example, because information about the measurement time window is also configured by the network device and then sent to the terminal device, the network device may send the information about the measurement time window together with the at least one piece of measurement information to the terminal device. For example, the information about the measurement time window and the at least one piece of measurement information may be added to one message and sent to the terminal device. Alternatively, the network device may separately send the information about the measurement time window and the at least one piece of measurement information to the terminal device by using different messages.

S53: When performing measurement, the terminal device determines that the terminal device meets the first condition.

S53 may occur after S51 and S52, or may occur before S51, or may occur before S51 and S52. This is not specifically limited.

The first condition has been described in the foregoing. If the first condition includes that the path on which the terminal device is located is the first path, the terminal device may determine whether the terminal device is located on the first path, and if it is determined that the terminal device is located on the first path, it can be determined that the terminal device meets the first condition. Alternatively, if the first condition includes that the path on which the terminal device is located is the first path, and the speed of the terminal device meets the first speed condition, the terminal device may determine whether the terminal device is located on the first path, and determine whether the speed of the terminal device meets the first speed condition, and if it is determined that the terminal device is located on the first path, and the speed of the terminal device meets the first speed condition, it can be determined that the terminal device meets the first condition. Alternatively, if the first condition includes that the speed of the terminal device meets the third speed condition, the terminal device may determine whether the speed of the terminal device meets the third speed condition, and if it is determined that the speed of the terminal device meets the third speed condition, it can be determined that the terminal device meets the first condition. Alternatively, if the first condition includes that the received signal (or the receive channel) of the terminal device meets the first threshold condition, the terminal device may determine whether the received signal (or the receive channel) of the terminal device meets the first threshold condition, and if it is determined that the received signal (or the receive channel) of the terminal device meets the first threshold condition, it can be determined that the terminal device meets the first condition. Alternatively, if the first condition includes that the path on which the terminal device is located is the first path, and the received signal (or the receive channel) of the terminal device meets the second threshold condition, the terminal device may determine whether the path on which the terminal device is located is the first path, and whether the received signal (or the receive channel) of the terminal device meets the second threshold condition, and if it is determined that the path on which the terminal device is located is the first path, and the received signal (or the receive channel) of the terminal device meets the second threshold condition, it can be determined that the terminal device meets the first condition.

For how the terminal device determines whether the terminal device is located on the first path and how the terminal device determines whether the speed of the terminal device meets the first speed condition or the third speed condition, refer to the foregoing descriptions.

S54: The terminal device measures a reference signal based on measurement information that is in the at least one piece of measurement information and that is corresponding to the first condition, where each piece of measurement information in the at least one piece of measurement information is used to indicate a reference signal in a measurement time window, each piece of measurement information in the at least one piece of measurement information corresponds to one or more conditions, and the measurement time window includes a reference signal sent by at least one cell.

If the terminal device determines that the first condition is met, the terminal device may select, from the at least one piece of measurement information, the measurement information corresponding to the first condition to perform measurement. Continue to refer to FIG. 9A. For example, the measurement time window includes reference signals sent by the cell 1, the cell 2, and the cell 3. The measurement information that is configured by the network device and that is corresponding to the first condition is an SMTC 1, and the SMTC 1 includes a part shown in region a in FIG. 9A. Measurement information that is configured by the network device and that is corresponding to the second condition is an SMTC 2, and the SMTC 2 includes a part shown in region b in FIG. 9A. Since the terminal device determines that the first condition is met, the terminal device may perform measurement based on the SMTC 1. In this case, only the reference signals sent by the cell 1 need to be measured, and the reference signals sent by the cell 2 and the cell 3 do not need to be measured. For the terminal device, a quantity of reference signals that need to be measured is reduced. Therefore, power consumption for measurement is reduced, measurement time is reduced, and cell handover or reselection efficiency is improved accordingly.

In the embodiment of this application, if the terminal device meets the first condition, the terminal device may measure a reference signal based on the measurement information corresponding to the first condition. This is equivalent to establishing a correspondence between measurement information and a condition. Measurement content corresponding to the measurement information corresponding to the first condition may be determined based on the first condition, so that a requirement corresponding to the first condition can be met, and the terminal device does not need to perform measurement based on measurement information irrelevant to the first condition. For example, the terminal device does not need to perform measurement for a cell irrelevant to the first condition, so that invalid measurement of the terminal device is reduced, power consumption of the terminal device is reduced, and measurement time is reduced.

In addition, as described above, in the current NR system or LTE system, for a terminal device in an idle mode or in an inactive mode, the base station usually sends broadcast information to broadcast a neighboring cell list for the terminal device to perform measurement. However, the base station usually broadcasts information about a large quantity of neighboring cells. As a result, the terminal device needs to search for a plurality of cells, and power consumption of the terminal device is relatively high.

For a terminal device in a connected mode, the base station configures an MO for the terminal device in the connected mode and provides a cell list corresponding to the MO for the terminal device to perform measurement. In this case, when the base station configures a large quantity of MOs for the terminal device or there is a large quantity of cells corresponding to the MO, the terminal device also needs to search for a plurality of cells, and power consumption of the terminal device is relatively high.

It can be learned that in this mechanism, power consumption of the terminal device is relatively high, and currently there is no solution to this.

In view of this, an embodiment of this application further provides a communication method, and the method can help reduce power consumption of the terminal device caused by measurement.

Figure 11:
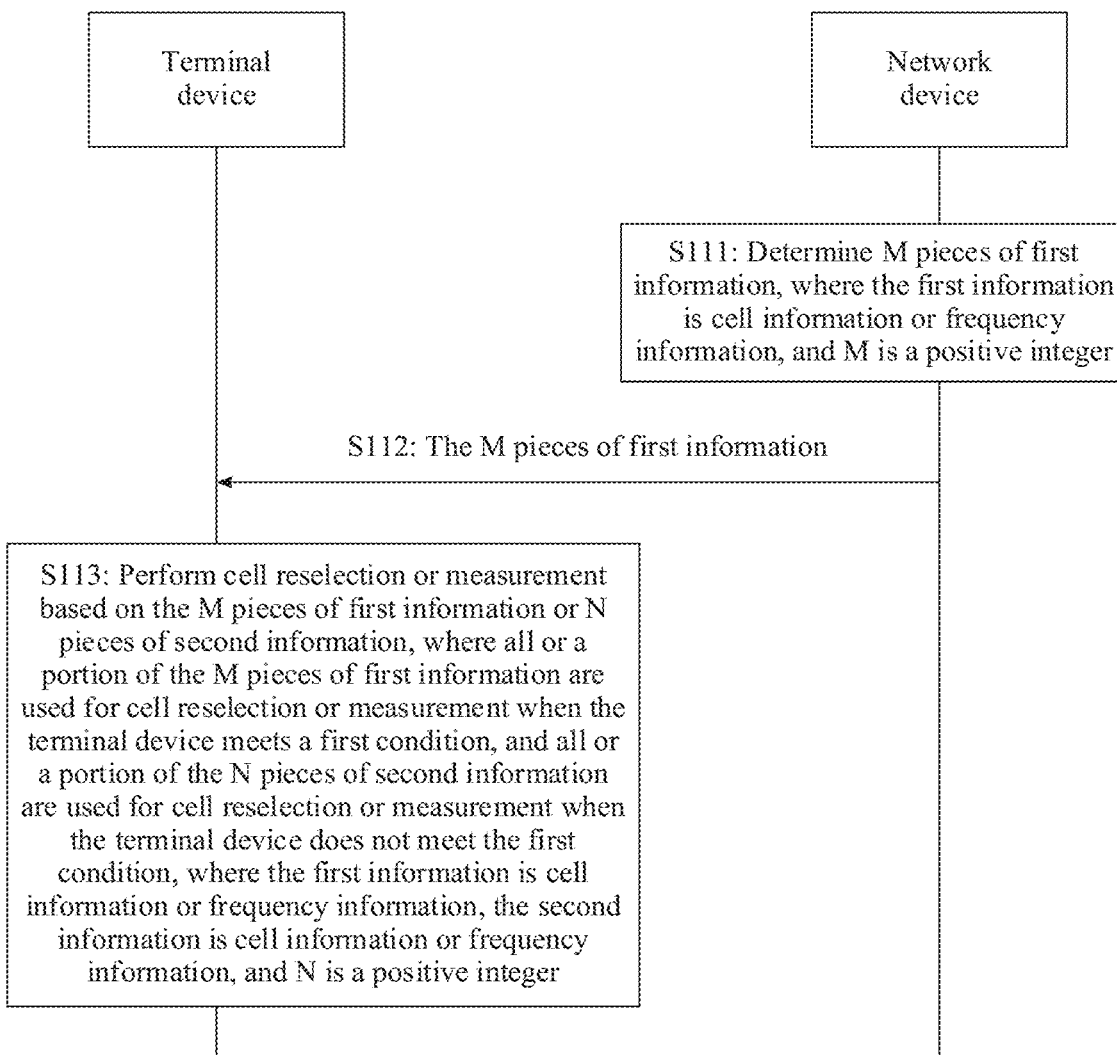
FIG. 11 is a flowchart of a communication method according to an embodiment of this application.

FIG. 11 is a flowchart of the method. In the following description process, an example in which the method is applied to the network architecture shown in FIG. 4 is still used. In addition, the method may be performed by two communications apparatuses. The two communications apparatuses are, for example, a third communications apparatus and a fourth communications apparatus. The third communications apparatus may be a network device or a communications apparatus that can support a network device in implementing a function required for the method, or the third communications apparatus may be a terminal device or a communications apparatus that can support a terminal device in implementing a function required for the method. Certainly, the third communications apparatus may alternatively be another communications apparatus, for example, a chip system. Similarly, the fourth communications apparatus may be a network device or a communications apparatus that can support a network device in implementing a function required for the method, or the fourth communications apparatus may be a terminal device or a communications apparatus that can support a terminal device in implementing a function required for the method. Certainly, the fourth communications apparatus may alternatively be another communications apparatus, for example, a chip system. In addition, implementations of the third communications apparatus and the fourth communications apparatus are not limited. For example, the third communications apparatus may be a network device, and the fourth communications apparatus is a terminal device; or both the third communications apparatus and the fourth communications apparatus are network devices; or both the third communications apparatus and the fourth communications apparatus are terminal devices; or the third communications apparatus is a network device, and the fourth communications apparatus is a communications apparatus that can support a terminal device in implementing a function required for the method. For example, the network device is a base station.

For ease of description, the following uses an example in which the method is performed by a network device and a terminal device, that is, an example in which the third communications apparatus is a network device and the fourth communications apparatus is a terminal device. An example in which this embodiment is applied to the network architecture shown in FIG. 4 is used. Therefore, a network device described below may be the network device in the network architecture shown in FIG. 4, and a terminal device described below may be the terminal device in the network architecture shown in FIG. 4.

S111: The network device determines M pieces of first information, where the first information is cell information or frequency information, and M is a positive integer.

S112: The network device sends the M pieces of first information to the terminal device, and the terminal device receives the M pieces of first information from the network device.

S113: The terminal device performs cell reselection or measurement based on the M pieces of first information or N pieces of second information, where all or a portion of the M pieces of first information are used for cell reselection or measurement when the terminal device meets a first condition, and all or a portion of the N pieces of second information are used for cell reselection or measurement when the terminal device does not meet the first condition, where the first information is cell information or frequency information, the second information is cell information or frequency information, and both M and N are positive integers.

For example, the first information is cell information, and the second information is cell information. Alternatively, the first information is cell information, and the second information is frequency information. Alternatively, the first information is frequency information, and the second information is frequency information. Alternatively, the first information is frequency information, and the second information is cell information. These combinations are described in the following.

In the embodiment of this application, the first condition may include: A path on which the terminal device is located is a first path; or a path on which the terminal device is located is a first path, and a speed of the terminal device meets a first speed condition; or the terminal device meets a third speed condition; or a received signal of the terminal device meets a first threshold condition; or a path on which the terminal device is located is a first path, and a received signal of the terminal device meets a first threshold condition. In other words, the first condition may be only a path condition, or a path condition and a speed condition, or only a speed condition, or only a received signal condition, or a path condition and a received signal condition. The path on which the terminal device is located may be a movement path of the terminal device, or referred to as a motion path of the terminal device. In other words, the first path is a movement path.

For example, there are a large quantity of users in vehicles on a relatively fixed route such as a city loop, a high-speed railway, or an expressway. To provide a relatively fast network speed for these users, the network device may determine M pieces of first information. A portion or all of the M pieces of first information may be used by a terminal device that meets the first condition to perform cell reselection or measurement. It can be learned from the first condition that the terminal device that meets the first condition may be a terminal device that travels on the city loop or the high-speed railway. In this manner, better use experience can be provided for the terminal device. The M pieces of first information are determined by the network device, for example, may be determined by the network device based on the first condition. For example, the M pieces of first information are information about M cells, and the M cells may be located on the first path. Refer to FIG. 8. For example, there are two arrows in FIG. 8, the two arrows each indicate one path, and both the two paths may be used as the first path. Certainly, the two first paths differ only in directions, but cover the same areas. Some different paths may cover different areas. In other words, different paths may be in different directions and/or cover different areas. Specifically, different paths may be in different directions or cover different areas, or different paths may be in different directions and cover different areas. For example, any path shown in FIG. 8 is used as the first path, and for example, the first information is cell information. In this case, the M pieces of first information determined by the network device may include information about the cell 2 to the cell 7 in FIG. 8. The cell 1 in FIG. 8 is, for example, a current serving cell of the terminal device. For a terminal device that meets the first condition, a selection range for cell reselection or measurement is reduced, so that the terminal device can perform cell reselection or measurement in a more targeted manner, and power consumption of the terminal device can be reduced because a quantity of cells that need to be measured is reduced.

The N pieces of second information and the M pieces of first information may be two separate parts. It may be considered that the M pieces of first information belong to one information list, for example, referred to as a first information list, and the N pieces of second information belong to one information list, for example, referred to as a second information list. Alternatively, the M pieces of first information may be included in the N pieces of second information, that is, the N pieces of second information and the M pieces of first information may be considered as one part, and a portion of information included in the N pieces of second information may be considered as the M pieces of first information. If the M pieces of first information are included in the N pieces of second information, which information in the N pieces of second information is information in the M pieces of first information may be indicated in a specific manner.

For example, the N pieces of second information may further include M pieces of indication information, and the M pieces of indication information are in a one-to-one correspondence with M pieces of second information in the N pieces of second information. In this case, the M pieces of second information indicated by the M pieces of indication information are the M pieces of first information. Alternatively, it may be considered that the N pieces of second information are located in an information list, and the information list may further include M pieces of indication information. For example, the M pieces of indication information are carried after corresponding first information. For example, one piece of indication information is added after each piece of second information in M pieces of second information. For example, the indication information occupies one bit. A piece of second information that carries the indication information is first information. Alternatively, the M pieces of indication information may be included in the N pieces of second information in a form of a bitmap. For example, the N pieces of second information further include a bitmap, and the bitmap includes N bits. If a value of a bit in the bitmap is "1", it indicates that second information corresponding to the bit is first information; if the value is "0", it indicates that the second information corresponding to the bit is not first information. In this case, each bit whose value is "1" in the bitmap may be considered as one piece of indication information. Alternatively, if a value of a bit in the bitmap is "0", it indicates that second information corresponding to the bit is first information; if the value is "1", it indicates that the second information corresponding to the bit is not first information. Each bit whose value is "0" in the bitmap may be considered as one piece of indication information. Alternatively, in this manner, the entire bitmap may be considered as one piece of indication information, and the N pieces of second information need to include only one piece of indication information. A correspondence between N bits in the bitmap and the N pieces of second information may be preconfigured by the network device or specified by a protocol.

Alternatively, the M pieces of first information may not be indicated by using the M pieces of indication information, but the M pieces of first information may be indicated by using other information. For example, the M pieces of second information in the N pieces of second information may carry other information, and the other information may implement a corresponding function, and further implicitly indicate that the M pieces of second information are the M pieces of first information. This manner is described later.

Certainly, even if the M pieces of first information are indicated by using other information, the N pieces of second information may still further include the M pieces of indication information. That is, the M pieces of first information are indicated by using both the M pieces of indication information and the other information, so that the indication is more specific.

As described above, the first condition may include: A path on which the terminal device is located is a first path; or a path on which the terminal device is located is a first path, and a speed of the terminal device meets a first speed condition; or the terminal device meets a third speed condition; or a received signal of the terminal device meets a first threshold condition; or a path on which the terminal device is located is a first path, and a received signal of the terminal device meets a first threshold condition. In other words, the first condition may be only a path condition, or a path condition and a speed condition, or only a speed condition, or only a received signal condition, or a path condition and a received signal condition. The following mainly describes content related to the speed condition and the received signal condition.

1. The first condition includes that the path on which the terminal device is located is the first path.

In this case, there may also be different manners for determining whether the terminal device meets the first condition.

In the first case, in an implementation of determining whether the terminal device meets the first condition, when the speed of the terminal device meets a second speed condition, it is determined that the path on which the terminal device is located is the first path. In this manner, the path is directly determined by using the speed. Generally, the speed of the terminal device can be learned by the terminal device itself. Therefore, it is clearly that this determining manner is relatively simple.

For example, the second speed condition is a speed threshold, and the speed threshold is corresponding to a channel change speed of the terminal device. In other words, the second speed condition is that the channel change speed of the terminal device is greater than or equal to the speed threshold. In this case, if the channel change speed of the terminal device is greater than the speed threshold, it can be determined that the terminal device meets the second speed condition, that is, it can be determined that the terminal device meets the first condition. The second speed condition may be a speed threshold, for example, it is specified that the channel change speed of the terminal device needs to be greater than or equal to the speed threshold. Alternatively, the second speed condition may be a speed range, for example, it is specified that the channel change speed of the terminal device needs to fall within the speed range. An implementation form of the second speed condition is not limited.

Alternatively, for example, the second speed condition is a change threshold, and the change threshold is corresponding to a quantity of cells that are reselected by the terminal device or to which the terminal device is handed over within first duration. In other words, the second speed condition is that the quantity of cells that are reselected by the terminal device or to which the terminal device is handed over within the first duration is greater than or equal to the change threshold. In this case, if the quantity of cells that are reselected by the terminal device or to which the terminal device is handed over within the first duration is greater than the change threshold, it can be determined that the terminal device meets the second speed condition, that is, it can be determined that the terminal device meets the first condition. The second speed condition may be a change threshold. For example, it is specified that the quantity of cells that are reselected by the terminal device or to which the terminal device is handed over within the first duration needs to be greater than or equal to the change threshold. Alternatively, it is specified that a quantity of changes of beams serving the terminal device in a current serving cell or camped-on cell within the first duration needs to be greater than or equal to the change threshold. Alternatively, the second speed condition may be a change interval. For example, it is specified that the quantity of cells that are reselected by the terminal device or to which the terminal device is handed over within the first duration needs to fall within the change interval. Alternatively, it is specified that the quantity of changes of beams serving the terminal device in the current serving cell or camped-on cell within the first duration needs to fall within the change interval. For example, in the first duration, if an index (index) of a beam serving the terminal device in the current serving cell or camped-on cell of the terminal device changes from index 1 to index 2, and then to index 3, a quantity of beam changes is 3. If the change threshold is set to 2, the terminal device meets the second speed condition. For another example, in the first duration, an index of a beam serving the terminal device in the current serving cell or camped-on cell of the terminal device changes from index 1 to index 2, and then to index 3, a quantity of beam changes is 3. If the change interval is set to [1, 3], the terminal device meets the second speed condition. The foregoing is merely an example. An implementation form of the second speed condition is not limited. The first duration may be configured by the network device, or may be specified in a protocol, or the like. The second speed condition and the first speed condition may be a same condition, or may be different conditions. A relationship between the two speed conditions is not limited. The second speed condition may be notified by the network device to the terminal device in advance, or may be specified in a protocol.

2. The first condition includes that the path on which the terminal device is located is the first path, and the speed of the terminal device meets the first speed condition.

For a determining manner of determining whether the speed of the terminal device meets the first speed condition, refer to the foregoing description of determining whether the terminal device meets the second speed condition. The first speed condition and the second speed condition may be different conditions. For example, the first speed condition is a change threshold, and the second speed condition is a speed threshold. Alternatively, the first speed condition and the second speed condition may be a same condition. For example, both the first speed condition and the second speed condition are speed thresholds, and the speed threshold corresponding to the first speed condition is the same as the speed threshold corresponding to the second speed condition.

3. The first condition includes that the speed of the terminal device meets the third speed condition.

For a determining manner of determining whether the speed of the terminal device meets the third speed condition, refer to the foregoing description of determining whether the terminal device meets the second speed condition.

The first speed condition, the second speed condition, and the third speed condition may be a same condition, or may be different conditions, or any two of the first speed condition, the second speed condition, and the third speed condition are a same condition, and a remaining speed condition is a different condition. The third speed condition may be notified by the network device to the terminal device in advance, or may be specified in a protocol.

4. The first condition includes that the received signal of the terminal device meets the first threshold condition. Alternatively, it may be understood that the first condition includes that a receive channel of the terminal device meets the first threshold condition. The receive channel may be a channel carrying a received signal.

The first threshold condition is, for example, a channel change threshold. For example, if a change amplitude of quality of signals received by the terminal device in a first time window or in second duration is greater than the channel change threshold, it can be determined that the received signal of the terminal device meets the first threshold condition. Alternatively, if a change amplitude of quality of receive channels of the terminal device in a first time window or in second duration is greater than the channel change threshold, it can be determined that the received signal of the terminal device meets the first threshold condition. The first time window or the second duration may be configured by the network device or specified in a protocol.

Alternatively, the first threshold condition is a threshold for a difference between highest received signal quality and lowest received signal quality, or is described as a threshold for a difference between highest receive channel quality and lowest receive channel quality.

The highest receive channel quality (or the highest received signal quality) is highest quality of a receive channel (or a received signal) in a second time window or third duration. The lowest receive channel quality (or the lowest received signal quality) is lowest quality of a receive channel (or a received signal) in the second time window or the third duration. The second time window or the third duration may be configured by the network device or specified in a protocol. If quality of a current receive channel (or received signal) of the terminal device is higher than the highest receive channel quality (or the highest received signal quality) or when the terminal device performs cell reselection, a value of the quality of the current receive channel may be updated to a value of the highest receive channel quality (or the highest received signal quality). Alternatively, if quality of a current receive channel (or received signal) of the terminal device is lower than the lowest receive channel quality (or the lowest received signal quality) or when the terminal device performs cell reselection, a value of the quality of the current receive channel (or received signal) may be updated to a value of the lowest receive channel quality (or the lowest received signal quality).

Alternatively, the first threshold condition is a threshold for a difference between reference signal quality and current received signal quality, or is described as a threshold for a difference between reference channel quality and current receive channel quality. The reference channel quality (or the reference signal quality) may be set in the following manner: If the current receive channel quality of the terminal device is higher than the reference channel quality, or the terminal device performs cell reselection, or a difference between the reference channel quality and the current receive channel quality of the terminal device in the third duration is less than a threshold, a value of the current receive channel quality of the terminal device is set to a value of the reference channel quality. The third duration may be configured by the network device or specified in a protocol.

Parameters used to measure signal quality (or channel quality) include but are not limited to at least one of reference signal received power (reference signal received power, RSRP), reference signal received quality (reference signal received quality, RSRQ), or a signal to interference plus noise ratio (signal to interference plus noise ratio, SINR). For example, the parameters used to measure signal quality (or channel quality) include RSRP, or include RSRQ, or include an SINR, or include RSRP and RSRQ, or include RSRP and an SINR, or include RSRQ and an SINR, or include RSRQ, RSRQ, and an SINR.

5. The first condition includes that the path on which the terminal device is located is the first path, and the received signal of the terminal device meets the first threshold condition. Alternatively, the first condition includes that the path on which the terminal device is located is the first path, and a receive channel of the terminal device meets the first threshold condition.

For how to determine whether the path on which the terminal device is located is the first path, and how to determine whether the received signal (or the receive channel) of the terminal device meets the first threshold condition, refer to the foregoing descriptions.

In addition, the first threshold condition and a second threshold condition may be different conditions. For example, the first threshold condition is a channel change threshold, and the second threshold condition is a threshold for a difference between highest received signal quality and lowest received signal quality. Alternatively, for example, both the first threshold condition and the second threshold condition are channel change thresholds, but a value of a channel change threshold used as the first threshold condition is different from a value of a channel change threshold used as the second threshold condition. Alternatively, the first threshold condition and the second threshold condition may be a same condition. For example, both the first threshold condition and the second threshold condition are thresholds for a difference between reference signal quality and current received signal quality. In addition, a value of a threshold used as the first threshold condition is the same as a value of a threshold used as the second threshold condition.

The foregoing describes a plurality of implementations of the first condition. Specific content of the first condition may be specified in a protocol, or may be preconfigured by the network device.

In the embodiment of this application, when the terminal device meets the first condition, the terminal device may perform cell reselection or measurement by using all or a portion of the M pieces of first information. When the terminal device does not meet the first condition, the terminal device may perform cell reselection or measurement by using all or a portion of the N pieces of second information. In other words, the M pieces of first information are provided for the terminal device that meets the first condition. In this case, for the terminal device that meets the first condition, it may be considered that information about a corresponding cell or frequency is provided in a targeted manner. This helps reduce a quantity of cells or frequencies that need to be measured by the terminal device that meets the first condition, thereby reducing power consumption of the terminal device.

The following describes, with reference to the accompanying drawings, apparatuses configured to implement the foregoing methods in the embodiments of this application. Therefore, all the foregoing content may be used in the following embodiments, and repeated content is not described again.

Figure 12:
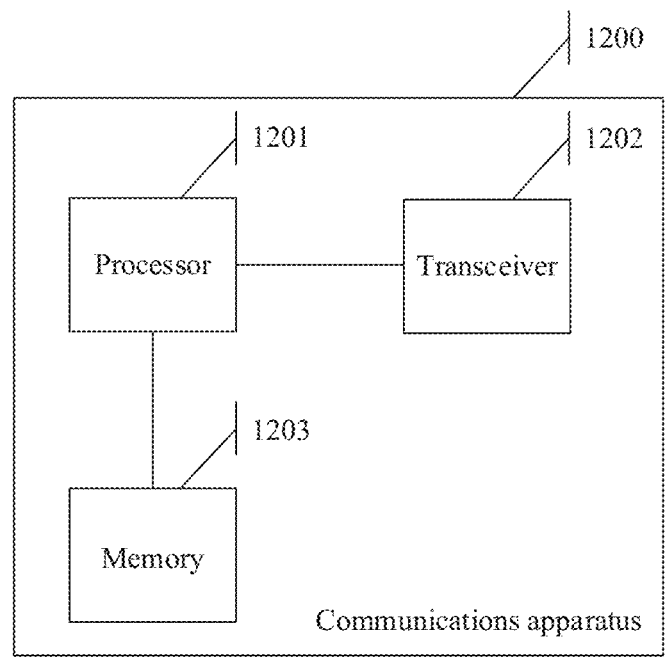
FIG. 12 is a schematic structural diagram of a communications apparatus according to an embodiment of this application.

An embodiment of this application provides a first type of communications apparatus. The communications apparatus is, for example, a first communications apparatus. Refer to FIG. 12. The communications apparatus is, for example, a communications apparatus 1200. The communications apparatus 1200 may implement functions of the terminal device described above. For example, the communications apparatus 1200 may be a communications device, or the communications apparatus 1200 may be a chip disposed in the foregoing terminal device. For example, the communications device may be the terminal device described above. The communications apparatus 1200 may include a processor 1201 and a memory 1203. The memory 1203 may be connected to the processor 1201 and may be configured to store instructions required by the processor 1201 to perform a task. In addition, the communications apparatus 1200 may further include a transceiver 1202, and the transceiver 1202 may be connected to the processor 1201. The processor 1201 may be configured to perform S53 and S54 in the embodiment shown in FIG. 5, and/or support another process of the technology described in this specification. The transceiver 1202 may be configured to perform S52 in the embodiment shown in FIG. 5, and/or configured to support another process of the technology described in this specification.

For example, the memory 1203 is configured to store instructions.

The processor 1201 is configured to execute the instructions stored in the memory to: determine, when performing measurement, that the communications apparatus 1200 meets a first condition, and measure a reference signal based on measurement information that is in at least one piece of measurement information and that is corresponding to the first condition. Each piece of measurement information in the at least one piece of measurement information is used to indicate information about a to-be-measured reference signal, and each piece of measurement information in the at least one piece of measurement information corresponds to one or more conditions.

In a possible implementation, the reference signal includes:
an SSB, or
a CSI-RS.

In a possible implementation, the reference signal sent by at least one cell is sent at at least one frequency.

In a possible implementation, one or any combination of the following is included:
one piece of measurement information in the at least one piece of measurement information is information about a synchronization signal block to measure; or
one piece of measurement information in the at least one piece of measurement information is a synchronization signal block-based measurement timing configuration; or
one piece of measurement information in the at least one piece of measurement information is a measurement timing configuration, where the measurement timing configuration indicates a time window used to measure a CSI-RS; or
one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the communications apparatus 1200 to measure a reference signal included in the portion of time segments; or
one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the communications apparatus 1200 to measure a reference signal included in the adjusted measurement time window; or
one piece of measurement information in the at least one piece of measurement information is offset information of a measurement time window, where the offset information is used to indicate information about length adjustment of the measurement time window, and a measurement time window obtained after adjustment based on the offset information is used by the communications apparatus 1200 to measure a reference signal included in the adjusted measurement time window; where
the measurement time window is used to indicate the terminal device to measure a reference signal in the measurement time window.

In a possible implementation,
the first condition includes that a path on which the communications apparatus 1200 is located is a first path; or
the first condition includes that a path on which the communications apparatus 1200 is located is a first path, and a speed of the communications apparatus 1200 meets a first speed condition; or
the first condition includes that the communications apparatus 1200 meets a third speed condition; or
the first condition includes that a received signal of the communications apparatus 1200 meets a first threshold condition; or
the first condition includes that a path on which the communications apparatus 1200 is located is a first path, and a received signal of the communications apparatus 1200 meets a second threshold condition.

In a possible implementation, when the speed of the communications apparatus 1200 meets a second speed condition, the path on which the communications apparatus 1200 is located is the first path, where the first condition includes that the path on which the communications apparatus 1200 is located is the first path.

In a possible implementation, the transceiver 1202 is configured to: before the processor 1201 measures the reference signal based on the measurement information that is in the at least one piece of measurement information and that is corresponding to the first condition, receive the at least one piece of measurement information from the network device.

All related content of the steps in the foregoing method embodiment may be cited in function descriptions of the corresponding function modules. Details are not described herein again.

An embodiment of this application provides a second type of communications apparatus. The communications apparatus is, for example, a second communications apparatus. The communications apparatus may implement functions of the network device described above. The communications apparatus may implement functions of the network device described above. For example, the communications apparatus may be a communications device, or the communications apparatus may be a chip disposed in the foregoing network device. For example, the communications device may be the network device described above. The communications apparatus may include a processor and a memory. The memory may be connected to the processor and may be configured to store instructions required by the processor to perform a task. In addition, the communications apparatus may further include a transceiver, and the transceiver may be connected to the processor. The processor may be configured to perform S51 in the embodiment shown in FIG. 5, and/or support another process of the technology described in this specification. The transceiver may be configured to perform S52 in the embodiment shown in FIG. 5, and/or configured to support another process of the technology described in this specification. For an accompanying drawing of the communications apparatus, refer to FIG. 12. To be specific, the communications apparatus may be the communications apparatus 1200, the processor may be the processor 1201, the transceiver may be the transceiver 1202, and the memory may be the memory 1203. The two communications apparatuses share one accompanying drawing. This does not mean that the two communications apparatuses are a same communications apparatus, but only components included in the two communications apparatuses are of similar types. Therefore, the two communications apparatuses are represented by using one accompanying drawing.

For example, the memory 1203 is configured to store instructions.

The processor 1201 is configured to execute the instructions stored in the memory to: determine at least one piece of measurement information, where each piece of measurement information in the at least one piece of measurement information is used to indicate information about a to-be-measured reference signal, and each piece of measurement information in the at least one piece of measurement information corresponds to one or more conditions.

The transceiver 1202 is configured to send the at least one piece of measurement information to a terminal device, where the at least one piece of measurement information is used by the terminal device to measure a reference signal based on the at least one piece of measurement information.

In a possible implementation, the reference signal includes:
an SSB, or
a CSI-RS.

In a possible implementation, the reference signal sent by at least one cell is sent at at least one frequency.

In a possible implementation, one or any combination of the following is included:
one piece of measurement information in the at least one piece of measurement information is information about a synchronization signal block to measure; or
one piece of measurement information in the at least one piece of measurement information is a synchronization signal block-based measurement timing configuration; or
one piece of measurement information in the at least one piece of measurement information is a measurement timing configuration, where the measurement timing configuration indicates a time window used to measure a CSI-RS; or
one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or
one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or
one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where
the measurement time window is used to indicate the terminal device to measure a reference signal in the measurement time window.

All related content of the steps in the foregoing method embodiment may be cited in function descriptions of the corresponding function modules. Details are not described herein again.

An embodiment of this application provides a third type of communications apparatus. The communications apparatus is, for example, a third communications apparatus. The communications apparatus may implement functions of the terminal device described above. The communications apparatus may implement functions of the terminal device described above. For example, the communications apparatus may be a communications device, or the communications apparatus may be a chip disposed in the foregoing terminal device. For example, the communications device may be the terminal device described above. The communications apparatus may include a processor and a transceiver. Optionally, the communications apparatus may further include a memory connected to the processor, and configured to store instructions required by the processor to perform a task. The processor may be configured to perform S113 in the embodiment shown in FIG. 11, and/or support another process of the technology described in this specification. The transceiver may be configured to perform S112 in the embodiment shown in FIG. 11, and/or configured to support another process of the technology described in this specification. For an accompanying drawing of the communications apparatus, refer to FIG. 12. To be specific, the communications apparatus may be the communications apparatus 1200, the processor may be the processor 1201, the transceiver may be the transceiver 1202, and the memory may be the memory 1203. The two communications apparatuses share one accompanying drawing. This does not mean that the two communications apparatuses are a same communications apparatus, but only components included in the two communications apparatuses are of similar types. Therefore, the two communications apparatuses are represented by using one accompanying drawing.

For example, the transceiver 1202 is configured to receive M pieces of first information from a network device.

The processor 1201 is configured to perform cell reselection or measurement based on the M pieces of first information or N pieces of second information, where all or a portion of the M pieces of first information are used for cell reselection or measurement when the terminal device meets a first condition, and all or a portion of the N pieces of second information are used for cell reselection or measurement when the communications apparatus 1200 does not meet the first condition, where the first information is cell information or frequency information, the second information is cell information or frequency information, and both M and N are positive integers.

In a possible implementation,
the first condition includes that a path on which the communications apparatus 1200 is located is a first path; or the first condition includes that a path on which the communications apparatus 1200 is located is a first path, and a speed of the communications apparatus 1200 meets a first speed condition; or the first condition includes that the communications apparatus 1200 meets a third speed condition; or the first condition includes that a received signal of the communications apparatus 1200 meets a first threshold condition; or the first condition includes that a path on which the communications apparatus 1200 is located is a first path, and a received signal of the communications apparatus 1200 meets a first threshold condition.

All related content of the steps in the foregoing method embodiment may be cited in function descriptions of the corresponding function modules. Details are not described herein again.

An embodiment of this application provides a fourth type of communications apparatus. The communications apparatus is, for example, a fourth communications apparatus. The communications apparatus may implement functions of the network device described above. The communications apparatus may implement functions of the network device described above. For example, the communications apparatus may be a communications device, or the communications apparatus may be a chip disposed in the foregoing network device. For example, the communications device may be the network device described above. The communications apparatus may include a processor and a transceiver. Optionally, the communications apparatus may further include a memory connected to the processor, and configured to store instructions required by the processor to perform a task. The processor may be configured to perform S111 in the embodiment shown in FIG. 11, and/or support another process of the technology described in this specification. The transceiver may be configured to perform S112 in the embodiment shown in FIG. 11, and/or configured to support another process of the technology described in this specification. For an accompanying drawing of the communications apparatus, refer to FIG. 12. To be specific, the communications apparatus may be the communications apparatus 1200, the processor may be the processor 1201, the transceiver may be the transceiver 1202, and the memory may be the memory 1203. The two communications apparatuses share one accompanying drawing. This does not mean that the two communications apparatuses are a same communications apparatus, but only components included in the two communications apparatuses are of similar types. Therefore, the two communications apparatuses are represented by using one accompanying drawing.

For example, the processor 1201 is configured to determine M pieces of first information, where all or a portion of the M pieces of first information are used for cell reselection or measurement when a terminal device meets a first condition, and all or a portion of N pieces of second information are used for cell reselection or measurement when the terminal device does not meet the first condition, where the first information is cell information or frequency information, the second information is cell information or frequency information, and both M and N are positive integers.

The transceiver 1202 is configured to send the M pieces of first information to the terminal device.

In a possible implementation,
the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or, the first condition includes that a path on which the terminal device is located is a first path, and a received signal of the terminal device meets a first threshold condition.

All related content of the steps in the foregoing method embodiment may be cited in function descriptions of the corresponding function modules. Details are not described herein again.

Figure 13A:
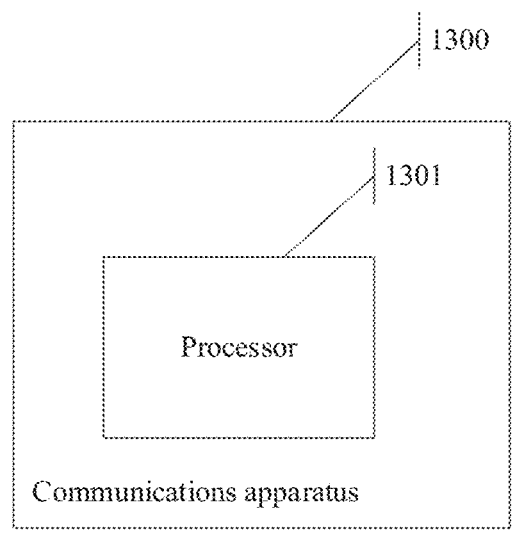
FIG. 13A and FIG. 13B are two schematic structural diagrams of a communications apparatus according to an embodiment of this application.

In a simple embodiment, a person skilled in the art can figure out that the foregoing several types of communications apparatuses may alternatively be implemented by using a structure of a communications apparatus 1300 shown in FIG. 13A. The communications apparatus 1300 may implement functions of the terminal device or network device described above. The communications apparatus 1300 may include a processor 1301.

When the communications apparatus 1300 is configured to implement the functions of the terminal device described above, the processor 1301 may be configured to perform S53 and S54 in the embodiment shown in FIG. 5, and/or configured to support another process of the technology described in this specification. Alternatively, when the communications apparatus 1300 is configured to implement the functions of the network device described above, the processor 1301 may be configured to perform S51 in the embodiment shown in FIG. 5, and/or configured to support another process of the technology described in this specification. Alternatively, when the communications apparatus 1300 is configured to implement the functions of the terminal device described above, the processor 1301 may be configured to perform S113 in the embodiment shown in FIG. 11, and/or configured to support another process of the technology described in this specification. Alternatively, when the communications apparatus 1300 is configured to implement the functions of the network device described above, the processor 1301 may be configured to perform S111 in the embodiment shown in FIG. 11, and/or configured to support another process of the technology described in this specification.

The communications apparatus 1300 may be implemented by a field-programmable gate array (field-programmable gate array, FPGA), an application-specific integrated circuit (application-specific integrated circuit, ASIC), a system on chip (system on chip, SoC), a central processing unit (central processing unit, CPU), a network processor (network processor, NP), a digital signal processor (digital signal processor, DSP), a micro controller unit (micro controller unit, MCU), a programmable logic device (programmable logic device, PLD), or another integrated chip. The communications apparatus 1300 may be disposed in the terminal device or network device in the embodiments of this application, so that the terminal device or the first network device implements the method provided in the embodiments of this application.

In an optional implementation, the communications apparatus 1300 may include a transceiver component, configured to communicate with another device. When the communications apparatus 1300 is configured to implement functions of the terminal device or the network device described above, the transceiver component may be configured to:

perform S52 in the embodiment shown in FIG. 5, and/or support another process of the technology described in this specification. Alternatively, when the communications apparatus 1300 is configured to implement functions of the terminal device or the network device described above, the transceiver component may be configured to: perform S112 in the embodiment shown in FIG. 11, and/or support another process of the technology described in this specification.

Figure 13B:
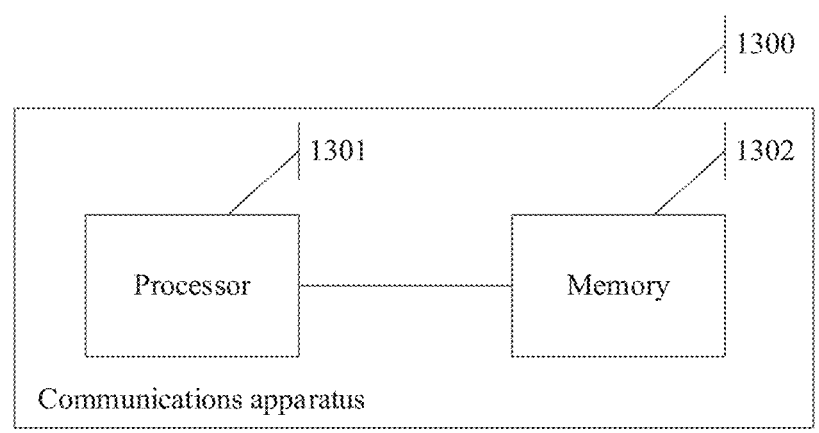

In an optional implementation, the communications apparatus 1300 may further include a memory 1302. Referring to FIG. 13B, the memory 1302 is configured to store computer programs or instructions, and the processor 1301 is configured to decode and execute the computer programs or the instructions. It should be understood that the computer programs or the instructions may include a function program of the foregoing terminal device or network device. When the function program of the terminal device is decoded and executed by the processor 1301, the terminal device can be enabled to implement functions of the terminal device in the method provided in the embodiment shown in FIG. 5 in the embodiments of this application, or implement functions of the terminal device in the method provided in the embodiment shown in FIG. 11 in the embodiments of this application. When the function program of the network device is decoded and executed by the processor 1301, the network device can be enabled to implement functions of the network device in the method provided in the embodiment shown in FIG. 5 in the embodiments of this application, or implement functions of the network device in the method provided in the embodiment shown in FIG. 11 in the embodiments of this application.

In another optional implementation, the function program of the terminal device or the network device is stored in an external memory of the communications apparatus 1300. When the function program of the terminal device is decoded and executed by the processor 1301, the memory 1302 temporarily stores a part or all of content of the function program of the terminal device. When the function program of the network device is decoded and executed by the processor 1301, the memory 1302 temporarily stores a part or all of content of the function program of the network device.

In still another optional implementation, the function program of the terminal device or the network device is set and stored in the internal memory 1302 of the communications apparatus 1300. When the internal memory 1302 of the communications apparatus 1300 stores the function program of the terminal device, the communications apparatus 1300 may be disposed in the terminal device in the embodiments of this application. When the internal memory 1302 of the communications apparatus 1300 stores the function program of the network device, the communications apparatus 1300 may be disposed in the network device in the embodiments of this application.

In yet another optional implementation, partial content of the function program of the terminal device is stored in an external memory of the communications apparatus 1300, and the other content of the function program of the terminal device is stored in the internal memory 1302 of the communications apparatus 1300. Alternatively, partial content of the function program of the network device is stored in an external memory of the communications apparatus 1300, and the other content of the function program of the network device is stored in the internal memory 1302 of the communications apparatus 1300.

In the embodiments of this application, the communications apparatus 1200 and the communications apparatus 1300 are presented in a form in which function modules are obtained through division based on corresponding functions, or may be presented in a form in which function modules are obtained through division in an integrated manner. The "module" herein may be an ASIC, a processor and a memory that execute one or more software or firmware programs, an integrated logic circuit, and/or another component that can provide the foregoing functions.

In addition, the first type of communications apparatus described above may alternatively be implemented in another form. For example, the communications apparatus includes a processing module and a storage module. Optionally, the communications apparatus may further include a transceiver module. For example, the processing module may be implemented by the processor 1201, and the transceiver module may be implemented by the transceiver 1202. The processing module may be configured to perform S53 and S54 in the embodiment shown in FIG. 5, and/or support another process of the technology described in this specification. The transceiver module may be configured to perform S52 in the embodiment shown in FIG. 5, and/or configured to support another process of the technology described in this specification.

For example, the storage module is configured to store instructions.

The processing module is configured to execute the instructions stored in the storage module to: determine, when performing measurement, that the communications apparatus meets a first condition, and measure a reference signal based on measurement information that is in at least one piece of measurement information and that is corresponding to the first condition. Each piece of measurement information in the at least one piece of measurement information is used to indicate information about a to-be-measured reference signal, and each piece of measurement information in the at least one piece of measurement information corresponds to one or more conditions.

In a possible implementation, the reference signal includes:
an SSB, or
a CSI-RS.

In a possible implementation, the reference signal sent by at least one cell is sent at at least one frequency.

In a possible implementation, one or any combination of the following is included:
one piece of measurement information in the at least one piece of measurement information is information about a synchronization signal block to measure; or
one piece of measurement information in the at least one piece of measurement information is a synchronization signal block-based measurement timing configuration; or
one piece of measurement information in the at least one piece of measurement information is a measurement timing configuration, where the measurement timing configuration indicates a time window used to measure a CSI-RS; or
one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the communications apparatus to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the communications apparatus to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the communications apparatus to measure a reference signal included in the adjusted measurement time window; where the measurement time window is used to indicate the terminal device to measure a reference signal in the measurement time window.

In a possible implementation, the first condition includes that a path on which the communications apparatus is located is a first path; or the first condition includes that a path on which the communications apparatus is located is a first path, and a speed of the communications apparatus meets a first speed condition; or the first condition includes that the communications apparatus meets a third speed condition; or the first condition includes that a received signal of the communications apparatus meets a first threshold condition; or the first condition includes that a path on which the communications apparatus is located is a first path, and a received signal of the communications apparatus meets a second threshold condition.

In a possible implementation, when the speed of the communications apparatus meets a second speed condition, the path on which the communications apparatus is located is the first path, where the first condition includes that the path on which the communications apparatus is located is the first path.

In a possible implementation, the transceiver module is configured to: before the processing module measures the reference signal based on the measurement information that is in the at least one piece of measurement information and that is corresponding to the first condition, receive the at least one piece of measurement information from the network device.

All related content of the steps in the foregoing method embodiment may be cited in function descriptions of the corresponding function modules. Details are not described herein again.

The second type of communications apparatus described above may alternatively be implemented in another form. For example, the communications apparatus includes a processing module and a storage module. Optionally, the communications apparatus may further include a transceiver module. For example, the processing module may be implemented by the processor 1201, and the transceiver module may be implemented by the transceiver 1202. The processing module may be configured to perform S51 in the embodiment shown in FIG. 5, and/or support another process of the technology described in this specification. The transceiver module may be configured to perform S52 in the embodiment shown in FIG. 5, and/or configured to support another process of the technology described in this specification.

For example, the storage module is configured to store instructions.

The processing module is configured to execute the instructions stored in the storage module to: determine at least one piece of measurement information, where each piece of measurement information in the at least one piece of measurement information is used to indicate information about a to-be-measured reference signal, and each piece of measurement information in the at least one piece of measurement information corresponds to one or more conditions.

The transceiver module is configured to send the at least one piece of measurement information to a terminal device, where the at least one piece of measurement information is used by the terminal device to measure a reference signal based on the at least one piece of measurement information.

In a possible implementation, the reference signal includes:

an SSB, or a CSI-RS.

In a possible implementation, the reference signal sent by at least one cell is sent at at least one frequency.

In a possible implementation, one or any combination of the following is included:

one piece of measurement information in the at least one piece of measurement information is information about a synchronization signal block to measure; or one piece of measurement information in the at least one piece of measurement information is a synchronization signal block-based measurement timing configuration; or one piece of measurement information in the at least one piece of measurement information is a measurement timing configuration, where the measurement timing configuration indicates a time window used to measure a CSI-RS; or one piece of measurement information in the at least one piece of measurement information is a bitmap, where bits included in the bitmap are in a one-to-one correspondence with time segments included in a measurement time window, the bitmap is used to indicate a portion of time segments in the measurement time window, and the portion of time segments are used by the terminal device to measure a reference signal included in the portion of time segments; or one piece of measurement information in the at least one piece of measurement information is a scaling factor, where the scaling factor is used to indicate information about length adjustment of the measurement time window, or is used to indicate information about periodicity adjustment of the measurement time window, and a measurement time window obtained after adjustment based on the scaling factor is used by the terminal device to measure a reference signal included in the adjusted measurement time window; or one piece of measurement information in the at least one piece of measurement information is offset information of a measurement time window, where the offset information is used to indicate information about length adjustment of the measurement time window, and a measurement time window obtained after adjustment based on the offset information is used by the terminal device to measure a reference signal included in the adjusted measurement time window; where the measurement time window is used to indicate the terminal device to measure a reference signal in the measurement time window.

All related content of the steps in the foregoing method embodiment may be cited in function descriptions of the corresponding function modules. Details are not described herein again.

The third type of communications apparatus described above may alternatively be implemented in another form. For example, the communications apparatus includes a processing module and a transceiver module. Optionally, the communications apparatus may further include a storage module, configured to store instructions required by the processing module. For example, the processing module may be implemented by the processor 1201, and the transceiver module may be implemented by the transceiver 1202. The processing module may be configured to perform S113 in the embodiment shown in FIG. 11, and/or support another process of the technology described in this specification. The transceiver module may be configured to perform S112 in the embodiment shown in FIG. 11, and/or configured to support another process of the technology described in this specification.

For example, the transceiver module is configured to receive M pieces of first information from a network device.

The processing module is configured to perform cell reselection or measurement based on the M pieces of first information or N pieces of second information, where all or a portion of the M pieces of first information are used for cell reselection or measurement when the terminal device meets a first condition, and all or a portion of the N pieces of second information are used for cell reselection or measurement when the communications apparatus does not meet the first condition, where the first information is cell information or frequency information, the second information is cell information or frequency information, and both M and N are positive integers.

In a possible implementation, the first condition includes that a path on which the communications apparatus is located is a first path; or the first condition includes that a path on which the communications apparatus is located is a first path, and a speed of the communications apparatus meets a first speed condition; or the first condition includes that the communications apparatus meets a third speed condition; or the first condition includes that a received signal of the communications apparatus meets a first threshold condition; or the first condition includes that a path on which the communications apparatus is located is a first path, and a received signal of the communications apparatus meets a first threshold condition.

All related content of the steps in the foregoing method embodiment may be cited in function descriptions of the corresponding function modules. Details are not described herein again.

The fourth type of communications apparatus described above may alternatively be implemented in another form. For example, the communications apparatus includes a processing module and a transceiver module. Optionally, the communications apparatus may further include a storage module, configured to store instructions required by the processing module. For example, the processing module may be implemented by the processor 1201, and the transceiver module may be implemented by the transceiver 1202. The processing module may be configured to perform S111 in the embodiment shown in FIG. 11, and/or support another process of the technology described in this specification. The transceiver module may be configured to perform S112 in the embodiment shown in FIG. 11, and/or configured to support another process of the technology described in this specification.

For example, the processing module is configured to determine M pieces of first information, where all or a portion of the M pieces of first information are used for cell reselection or measurement when a terminal device meets a first condition, and all or a portion of N pieces of second information are used for cell reselection or measurement when the terminal device does not meet the first condition, where the first information is cell information or frequency information, the second information is cell information or frequency information, and both M and N are positive integers.

The transceiver module is configured to send the M pieces of first information to the terminal device.

In a possible implementation, the first condition includes that a path on which the terminal device is located is a first path; or the first condition includes that a path on which the terminal device is located is a first path, and a speed of the terminal device meets a first speed condition; or the first condition includes that the terminal device meets a third speed condition; or the first condition includes that a received signal of the terminal device meets a first threshold condition; or, the first condition includes that a path on which the terminal device is located is a first path, and a received signal of the terminal device meets a first threshold condition.

All related content of the steps in the foregoing method embodiment may be cited in function descriptions of the corresponding function modules. Details are not described herein again.

The communications apparatus 1200 and the communications apparatus 1300 provided in the embodiments of this application may be configured to perform the method provided in the embodiment shown in FIG. 5 or the method provided in the embodiment shown in FIG. 11. Therefore, for technical effects that can be achieved by the communications apparatus 1200 and the communications apparatus 1300, refer to the foregoing method embodiments. Details are not described herein again.

The embodiments of this application are described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or the processor of the another programmable data processing device generate an apparatus for implementing a specific function in one or more processes in the flowcharts and/or in one or more blocks in the block diagrams.

All or some of the foregoing embodiments may be implemented by using software, hardware, firmware, or any combination thereof. When the software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, wireless, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a digital versatile disc (digital versatile disc, DVD)), a semiconductor medium (for example, a solid-state drive (solid state disk, SSD)), or the like.

It is clear that a person skilled in the art can make various modifications and variations to the embodiments of this application without departing from the spirit and scope of this application. This application is intended to cover these modifications and variations of the embodiments of this application provided that they fall within the scope of protection defined by the following claims and their equivalent technologies.

What is claimed is:

1. A method implemented by a terminal device, wherein the method comprises:
   receiving, from a network device, at least one piece of measurement information, wherein each piece of measurement information in the at least one piece of measurement information indicates information about a to-be-measured reference signal and corresponds to one or more second conditions;
   determining that the terminal device meets a first condition for performing a measurement, wherein the first condition is one of the one or more second conditions;
   selecting, based on the at least one piece of measurement information corresponding to the first condition, one or more reference signals corresponding to the first condition;
   measuring the one or more reference signals to obtain one or more measured reference signals; and
   selecting, based on the one or more measured reference signals, a target cell for cell handover or cell reselection,
   wherein the first condition comprises:
      that a path on which the terminal device is located is a first path;
      that a path on which the terminal device is located is the first path and a speed of the terminal device meets a first speed condition; or
      that the terminal device meets a second speed condition.

2. The method of claim 1, wherein each of the one or more reference signals comprises:
   a synchronization signal block (SSB); or
   a channel state information reference signal (CSI-RS).

3. The method of claim 2, further comprising receiving a reference signal of the one or more reference signals on at least one frequency from a cell.

4. The method of claim 1, wherein the at least one piece of measurement information comprises:
   measurement information for a synchronization signal block (SSB);
   measurement information for a SSB-based measurement timing configuration;
   measurement information for a measurement timing configuration indicating a measurement time window for a channel state information reference signal (CSI-RS);
   measurement information in a bitmap, wherein one or more bits in the bitmap are in a one-to-one correspondence with one or more time segments in a measurement time window, and wherein the bitmap indicates a portion of the time segments that enables the terminal device to measure the one or more reference signals in the portion of time segments;
   measurement information that is a scaling factor-indicating either first information about length adjustment of a measurement time window or second information about periodicity adjustment of the measurement time window, and wherein the measurement time window obtained after adjustment based on the scaling factor enables the terminal device to measure the one or more reference signals in an adjusted measurement time window; or
   measurement information that is offset information of a measurement time window, wherein the offset information indicates information about length adjustment of the measurement time window, wherein the measurement time window obtained after adjustment based on the offset information enables the terminal device to measure the one or more reference signals in the adjusted measurement time window, and wherein the measurement time window indicates the terminal device to measure the one or more reference signals.

5. The method of claim 1, wherein the first condition further indicates that:
   a received signal of the terminal device meets a first threshold condition; or
   the terminal device is located in the first path and the received signal of the terminal device meets a second threshold condition.

6. The method of claim 5, wherein the speed meets a third speed condition, wherein the terminal device is located in the first path, and wherein the first condition indicates that the terminal device is located in the first path.

7. The method of claim 1, wherein determining that the terminal device meets the first condition for performing the measurement comprises determining that the terminal device meets the first condition for performing the measurement based on historical information of prior cell handover or cell reselection performed by the terminal device.

8. A method comprising:
   receiving at least one piece of measurement information, wherein each piece of measurement information in the at least one piece of measurement information indicates information about a to-be-measured reference signal and corresponds to one or more second conditions;
   determining that a terminal device meets a first condition for performing a measurement, wherein the first condition is one of the one or more second conditions;

selecting, based on the at least one piece of measurement information corresponding to the first condition, one or more reference signals corresponding to the first condition;

measuring the one or more reference signals to obtain one or more measured reference signals; and selecting, based on the one or more measured reference signals, a target cell for cell handover or cell reselection, wherein the first condition comprises:
- that a path on which the terminal device is located is a first path;
- that a path on which the terminal device is located is the first path and a speed of the terminal device meets a first speed condition; or
- that the terminal device meets a second speed condition.

9. The method of claim 8, wherein each of the one or more reference signals comprises a channel state information reference signal (CSI-RS).

10. The method of claim 8, wherein each of the one or more reference signals comprises a synchronization signal block (SSB).

11. The method of claim 8, wherein the at least one piece of measurement information comprises:

measurement information for a synchronization signal block (SSB);

measurement information for a SSB-based measurement timing configuration;

measurement information for a channel state information reference signal (CSI-RS) measurement timing configuration indicating a measurement time window for a CSI-RS;

measurement information in a bitmap, wherein one or more bits in the bitmap are in a one-to-one correspondence with one or more time segments in a first measurement time window, wherein the bitmap indicates a portion of the time segments, and wherein the portion enables the terminal device to measure the one or more reference signals in the portion of time segments;

measurement information that is a scaling factor, wherein the scaling factor indicates either first information about length adjustment of the measurement time window or second information about periodicity adjustment of the measurement time window, and wherein the measurement time window obtained after adjustment based on the scaling factor enables the terminal device to measure the one or more reference signals in an adjusted measurement time window; or measurement information that is offset information of a measurement time window, wherein the offset information indicates information about length adjustment of the measurement time window, wherein the measurement time window obtained after adjustment based on the offset information enables the terminal device to measure the one or more reference signals in the adjusted measurement time window, and wherein the measurement time window indicates the terminal device to measure the one or more reference signals in the measurement time window.

12. A communications apparatus comprising:
a memory configured to store instructions; and
a processor coupled to the memory, wherein the instructions cause the processor to be configured to:
receive, from a network device, at least one piece of measurement information, wherein each piece of measurement information in the at least one piece of measurement information indicates information about a to-be-measured reference signal and corresponds to one or more second conditions;

determine, during a measurement, that a terminal device meets a first condition, wherein the first condition is one of the one or more second conditions;

select, based on the at least one piece of measurement information corresponding to the first condition, one or more reference signals corresponding to the first condition;

measure the one or more reference signals to obtain one or more measured reference signals; and select, based on the one or more measured reference signals, a target cell for cell handover or cell reselection, wherein the first condition comprises:
- that a path on which the terminal device is located is a first path;
- that a path on which the terminal device is located is the first path and a speed of the terminal device meets a first speed condition; or
- that the terminal device meets a second speed condition.

13. The communications apparatus of claim 12, wherein each of the one or more reference signals comprises a channel state information reference signal (CSI-RS).

14. The communications apparatus of claim 13, wherein the instructions further cause the processor to be configured to receive a reference signal of the one or more reference signals from a cell on at least one frequency.

15. The communications apparatus of claim 12, wherein the at least one piece of measurement information comprises:

measurement information about a synchronization signal block (SSB) to measure;

measurement information about an SSB-based measurement timing configuration;

measurement information about a measurement timing configuration indicating a measurement time window for a channel state information reference signal (CSI-RS);

measurement information in a bitmap, wherein one or more bits in the bitmap are in a one-to-one correspondence with one or more time segments in a measurement time window, wherein the bitmap indicates a portion of the time segments in the measurement time window, and wherein the portion enables the terminal device to measure the one or more reference signals in the portion of time segments;

measurement information that is a scaling factor indicating either first information about length adjustment of the measurement time window or second information about periodicity adjustment of the measurement time window, and wherein the measurement time window obtained after adjustment based on the scaling factor enables the terminal device to measure the one or more reference signals in an in the adjusted measurement time window; or measurement information that is offset information of a measurement time window, wherein the offset information indicates information about length adjustment of the measurement time window, wherein the measurement time window obtained after adjustment based on the offset information enables the terminal device to measure the one or more reference signals in the adjusted measurement time window, and wherein the measurement time window indicates the terminal device to measure the one or more reference signals reference signal in the measurement time window.

16. The communications apparatus of claim 12, wherein the first condition further comprises that:
a received signal of the terminal device meets a first threshold condition; or
the terminal device is located in the first path and the received signal meets a second threshold condition.

17. The communications apparatus of claim 16, wherein the speed meets a third speed condition, wherein the terminal device is located in the first path, and wherein the first condition indicates that the terminal device is located in the first path.

18. The communications apparatus of claim 12, wherein each of the one or more reference signals comprises a synchronization signal block (SSB).

19. The communications apparatus of claim 18, wherein the instructions further cause the processor to be configured to receive a reference signal of the one or more reference signals from a cell at a first frequency.

20. The communications apparatus of claim 12, wherein the instructions further cause the processor to determine that the terminal device meets the first condition for performing the measurement by determining that the terminal device meets the first condition for performing the measurement based on historical information of prior cell handover or cell reselection performed by the terminal device.

* * * * *